United States Patent [19]
Hayashi et al.

[11] Patent Number: 6,123,424
[45] Date of Patent: Sep. 26, 2000

[54] OPTICAL SYSTEM FOR USE IN AN IMAGE PROJECTOR

[75] Inventors: Kohtaro Hayashi, Toyonaka; Kenji Konno, Sakai, both of Japan

[73] Assignee: Minolta Co., Ltd., Osaka, Japan

[21] Appl. No.: 09/337,428

[22] Filed: Jun. 21, 1999

[30] Foreign Application Priority Data

Jun. 23, 1998 [JP] Japan .................................. 10-175769

[51] Int. Cl.$^7$ .................................................. G03B 21/00
[52] U.S. Cl. ................................ 353/20; 353/634; 353/31
[58] Field of Search .................................. 353/20, 8, 122, 353/31; 349/9, 18; 359/487, 488, 495, 500, 501, 634

[56] References Cited

U.S. PATENT DOCUMENTS

| | | | |
|---|---|---|---|
| 5,200,857 | 4/1993 | Matsushita | 359/634 |
| 5,424,868 | 6/1995 | Fielding et al. | 359/634 |
| 5,648,870 | 7/1997 | Mitsutake | 359/487 |
| 5,890,786 | 4/1999 | Kurematsu | 353/20 |
| 5,986,814 | 11/1999 | Reinsch | 359/634 |

FOREIGN PATENT DOCUMENTS 63-292892  11/1988  Japan .

*Primary Examiner*—William Dowling
*Attorney, Agent, or Firm*—Sidley & Austin

[57] ABSTRACT

A projector optical system has an illumination optical system, a dichroic surface, and a projection lens system. The dichroic surface is inclined with respect to the illumination principal ray traveling from the beam center of the illumination light emitted from the illumination optical system to the centers of the reflection-type display panels, and also with respect to the projection principal ray traveling from the centers of the reflection-type display panels to the center of the aperture stop of the projection lens system.

5 Claims, 16 Drawing Sheets

OPTICAL SYSTEM FOR USE IN AN IMAGE PROJECTOR

This application is based on application No. H10-175769 filed in Japan, the content of which is hereby incorporated by reference.

BACKGROUND OF THE INVENTION

1. Field of the Invention

The present invention relates to an optical system for use in an image projector (hereafter such an optical system will be referred to as a "projector optical system"), and more particularly to a projector optical system for use in an image projection apparatus (such as a liquid crystal projector) for projecting an image from a reflection-type display panel (such as a reflection-type liquid crystal panel) onto a screen.

2. Description of the Prior Art

In recent years, reflection-type LCD (liquid crystal display) panels are receiving much attention. This is because, as compared with a transmission-type LCD panel, a reflection-type LCD panel offers a higher aperture ratio and thus allows more efficient use of light. Illumination light shone onto the display surface of such a reflection-type LCD panel is reflected therefrom as projection light that has a reflection angle substantially of the same magnitude as but of the opposite sign to the incident angle of the illumination light. Thus, by illuminating the display surface of a reflection-type LCD panel substantially perpendicularly, it is possible to project an image by using the projection light exiting therefrom substantially perpendicularly. FIG. 13 shows an example of a projector optical system that projects an image in this way.

As shown in FIG. 13, the illumination light emitted from a light source (1) is first reflected from a reflector (2), and then passes through an illumination optical system (OP1). The illumination optical system (OP1) includes an integrator, a polarization conversion optical system, and other components. The integrator serves to illuminate reflection-type LCD panels (pr, pg, and pb) evenly and efficiently. The polarization conversion optical system makes the polarization direction of the illumination light uniform. After passing through the illumination optical system (OP1), the illumination light, now polarized on a particular polarization plane, is separated into three light components of different colors R (red), G (green), and B (blue) by a color separating optical system composed of two dichroic mirrors (M1 and M2). Then, the B light component of the illumination light enters a polarizing beam splitter (BS2); the R light component of the illumination light enters a polarizing beam splitter (BS2); and the G light component of the illumination light enters a polarizing beam splitter (BS3). These polarizing beam splitters (BS1 to BS3) are disposed with their S-polarization plane aligned with the polarization plane of the illumination light. Thus, only S-polarized light included in the illumination light is reflected from the polarizing beam splitters (BS1 to BS3) so that the individual light components of different colors enter the display surfaces of the corresponding reflection-type LCD panels (pr, pg, and pb) perpendicularly.

The illumination light incident on the reflection-type LCD panels (pr, pg, and pb) is reflected therefrom as partially P-polarized and partially S-polarized light according to the pattern formed by the pixels of the LCD panels. Then, the projection light (still including P-polarized and S-polarized light) regularly reflected perpendicularly from the reflection-type LCD panels (pr, pg, and pb) enters the polarizing beam splitters (BS1 to BS3) once again. Since the polarizing beam splitters (BS1 to BS3) reflect S-polarized light and transmit P-polarized light, only that portion of the illumination light which was converted into P-polarized light by the reflection-type LCD panels (pr, pg, and pb) is, as projection light, allowed to enter a projection lens system (OP2). The light components of three colors constituting the projection light (now including only P-polarized light) transmitted through the polarizing beam splitters (BS1 to BS3) are integrated together by a color integrating optical system composed of a cross dichroic prism (DP), and is then projected through the projection lens system (OP2) to form an image on a screen (not shown).

In the above-described conventional arrangement (see FIG. 13), the polarizing beam splitters (BS1 to BS3) determine, by transmitting only P-polarized light, whether the individual pixels are "on" or "off". Thus, the characteristics of the polarizing beam splitters (BS1 to BS3) (i.e. how far they can cut the portion of the projection light which strikes the "off" pixels) affect the contrast of the projected image. However, since the characteristics of the polarizing beam splitters (BS1 to BS3) tend to vary with the internal strain of its glass material and with the incident angle of light rays, the use of polarizing beam splitters (BS1 to BS3) does not necessarily ensure high performance.

To avoid such a problem, various projector optical systems have conventionally been proposed that employ no polarizing beam splitter. FIGS. 14 and 15 show an example of such a projector optical system. In FIGS. 14 and 15, X, Y, and Z represent directions perpendicular to one another, with the direction of the optical axis of the projection lens system (OP2) used as the Z direction. The section (the YZ section) of he optical path along which an illumination optical system (OP1) achieves illumination is substantially perpendicular to the section (the XZ section) of the optical path along which a cross dichroic prism (DP) performs color separation and integration. Both the illumination principal ray (L1) (the light ray traveling from the beam center of the illumination light emitted from the illumination optical system (OPI) to the center of a reflection-type LCD panel (PG)) and the projection principal ray (L2) (the light ray traveling from the center of the reflection-type LCD panel (PG) to the center of the aperture stop of the projection lens system (OP2)) lie on the YZ plane.

The illumination light emitted from a light source (1) is first reflected from a reflector (2), and then passes through an illumination optical system (OP1). The illumination optical system (OP1) includes, like that of the conventional example shown in FIG. 13, an integrator, a polarization conversion optical system, and others. The illumination light has its polarization direction aligned with the Y' direction (the direction perpendicular to the illumination principal ray (L1) and lying on the YZ plane) by the illumination optical system (OP1), is then subjected to color separation by a color separating/integrating optical system composed of a cross dichroic prism (DP), and then enters a blaze-formed diffraction grating (GP) (not shown in FIG. 15). The blaze-formed diffraction grating (GP) is disposed immediately in front of each of reflection-type LCD panels (PR, PG, and PB) so as to serve as an auxiliary optical system that allows the illumination light obliquely incident on the individual reflection-type LCD panels (PR, PG, and PB) to be reflected therefrom substantially perpendicularly.

The illumination light transmitted through the blaze-formed diffraction grating (GP) then enters the reflection-type LCD panels (PR, PG, and PB). Each reflection-type LCD panel (PR, PG, and PB) has a polarizing plate (PP)

disposed on the cross-dichroic-prism (DP) side thereof. The polarizing plate (PP) is disposed with its polarization axis (AXP) (the polarization direction) aligned with the Y direction. Thus, of the incident light transmitted through the polarizing plate (PP), that portion which has its polarizing plane rotated by being reflected from the reflection-type LCD panels (PR, PG, and PB) is, when exiting, cut by the polarizing plate (PP). The projection light exiting from the reflection-type LCD panels (PR, PG, and PB) is, after passing through the blaze-formed diffraction grating (GP), integrated together by the cross dichroic prism (DP) and then projected through the projection lens system (OP2) to form an image on a screen (not shown).

Note that projector optical systems having the same structure as shown in FIGS. 14 and 15 are proposed by Japanese Laid-Open Patent Application No. S63-292892 and others. However, these projector optical systems do not include a polarization conversion optical system within their illumination optical system. A reflection-type LCD panel is designed to accept only light that is polarized on a particular polarizing plane by being transmitted through a polarizing plate. Accordingly, the portion of the illumination light that is not polarized in a specific direction by a polarization conversion optical system is not allowed to pass through the polarizing plate, and thus is not used. This makes efficient use of light impossible.

As shown in FIGS. 14 and 15, by using an illumination optical system (OP1) that includes a polarization conversion optical system, the above-described problem can be prevented. In this case, however, the following problem arises instead. As shown in FIG. 15, a polarizing plate, which is cemented on the surface of a reflection-type LCD panel, is typically disposed with its polarization direction aligned either with the short-side direction of the panel (in FIG. 15, the Y direction) or with the long-side direction of the panel (in FIG. 15, the X direction). Thus, the illumination light emitted from the illumination optical system (including a polarization conversion optical system) is set to travel with its polarization plane aligned either with the YZ plane shown in FIG. 15 or with the X direction perpendicular to the YZ plane.

In the conventional example shown in FIG. 15, the polarization direction (AXP) of the polarizing plate (PP) is aligned with the Y direction, and the polarization direction of the illumination light emitted from the illumination optical system (OP1) is aligned with the Y' direction. Thus, if no consideration is given to the dichroic prism (DP), the illumination light having a polarization plane parallel to the YZ plane is allowed to pass through the polarizing plate (PP). In this case, however, due to the positional relationship between the optical path from the illumination optical system (OP1) and the dichroic surface of the cross dichroic prism (DP), the illumination light that is supposed to be polarized wholly in the Y' direction is, when passing through the dichroic surface, separated into a light component polarized in the X direction and a light component polarized in the Y' direction.

This occurs because the polarized light is deviated from the S- and P-polarization planes when entering the dichroic surface. If a deviation in the phase or the like occurs additionally, the light will be polarized elliptically. The degree of the above-mentioned separation is wavelength-dependent. For example, FIG. 16 shows the spectral transmittance of the light components polarized in the X and Y' directions (indicated by the broken and solid lines, respectively) as observed when the illumination light is shone onto the dichroic surface that reflects the B light component. The reflection-type 1, CD panels (PR, PG, and PB) are not designed to transmit a light component polarized in the X direction. Therefore, if the polarized light includes a light component polarized in the X direction, it is impossible to achieve efficient use of light. Moreover, the characteristics related to spectral transmittance vary with the incident angle of the illumination light. As a result, it is impossible to achieve even color distribution.

SUMMARY OF THE INVENTION

An object of the present invention is to provide a projector optical system free from degradation of efficiency and uneven color distribution due to separation of the polarization plane as occurs when uniformly polarized illumination light is subjected to color separation.

To achieve the above object, according to one aspect of the present invention, a projector optical system is provided with an illumination optical system, a dichroic surface, and a projection lens system. The illumination optical system emits polarized light as illumination light. The dichroic surface separates the illumination light into light components of different colors and then directs those light components individually to a plurality of reflection-type display panels each having a polarizing plate on the front surface thereof and integrates together the light components of different colors reflected from the reflection-type display panels and then emits those light components thus integrated together as projection light. The projection lens system displays an image by projecting the projection light. In this projector optical system, the dichroic surface is inclined with respect to the illumination principal ray traveling from the beam center of the illumination light emitted from the illumination optical system to the centers of the reflection-type display panels, and also with respect to the projection principal ray traveling from the centers of the reflection-type display panels to the center of the aperture stop of the projection lens system. In addition, one of the following conditions (1) to (4) is fulfilled:

$$(1/2)\cdot(\theta_{si}-\theta_{sp}) < (\theta-\theta_{sp}) < (3/2)\cdot(\theta_{si}-\theta_{sp}) \tag{1}$$

$$(1/2)\cdot(\theta_{si}-\theta_{sp}) > (\theta-\theta_{sp}) > (3/2)\cdot(\theta_{si}-\theta_{sp}) \tag{2}$$

$$(1/2)\cdot(\theta_{si}-\theta_{sp}) < (\theta-\theta_{sp}+90) < (3/2)\cdot(\theta_{si}-\theta_{sp}) \tag{3}$$

$$(1/2)\cdot(\theta_{si}-\theta_{sp}) > (\theta-\theta_{sp}+90) > (3/2)\cdot(\theta_{si}-\theta_{sp}) \tag{4}$$

where $\theta$ represents the angle (°) that the polarization plane of the illumination light makes with a predetermined reference axis on the dichroic surface;

$\theta_{si}$ represents the angle (°) that the S-polarization plane of the illumination principal ray makes with the predetermined reference axis on the dichroic surface; and $\theta_{sp}$ represents the angle (°) that the S-polarization plane of the projection principal ray makes with the predetermined reference axis on the dichroic surface.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Hereinafter, projector optical systems embodying the present invention will be described with reference to the accompanying drawings. Note that, in the figures, X, Y, and Z represent directions perpendicular to one another, with the direction of the optical axis of the projection lens system (OP2) used as the Z direction. In addition, in the following descriptions, the components that play the same or corresponding roles in different embodiments will be identified with the same reference symbols, and overlapping descriptions will be omitted.

<First Embodiment (FIGS. 1 to 4, and 9 to 12)>

Figure 1:
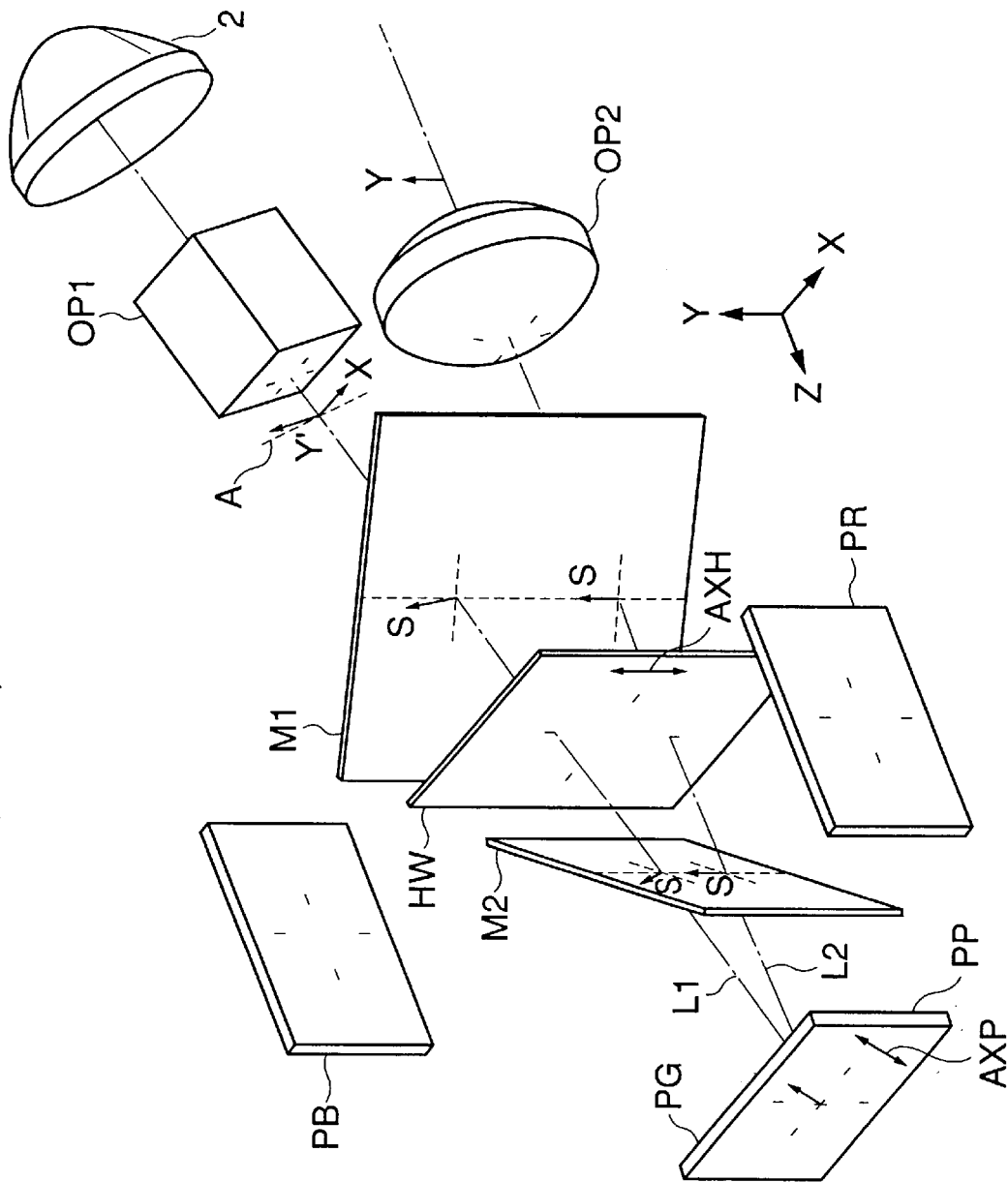
FIG. 1 is a perspective view illustrating the optical arrangement of the projector optical system of a first embodiment of the present invention.
Figure 2:
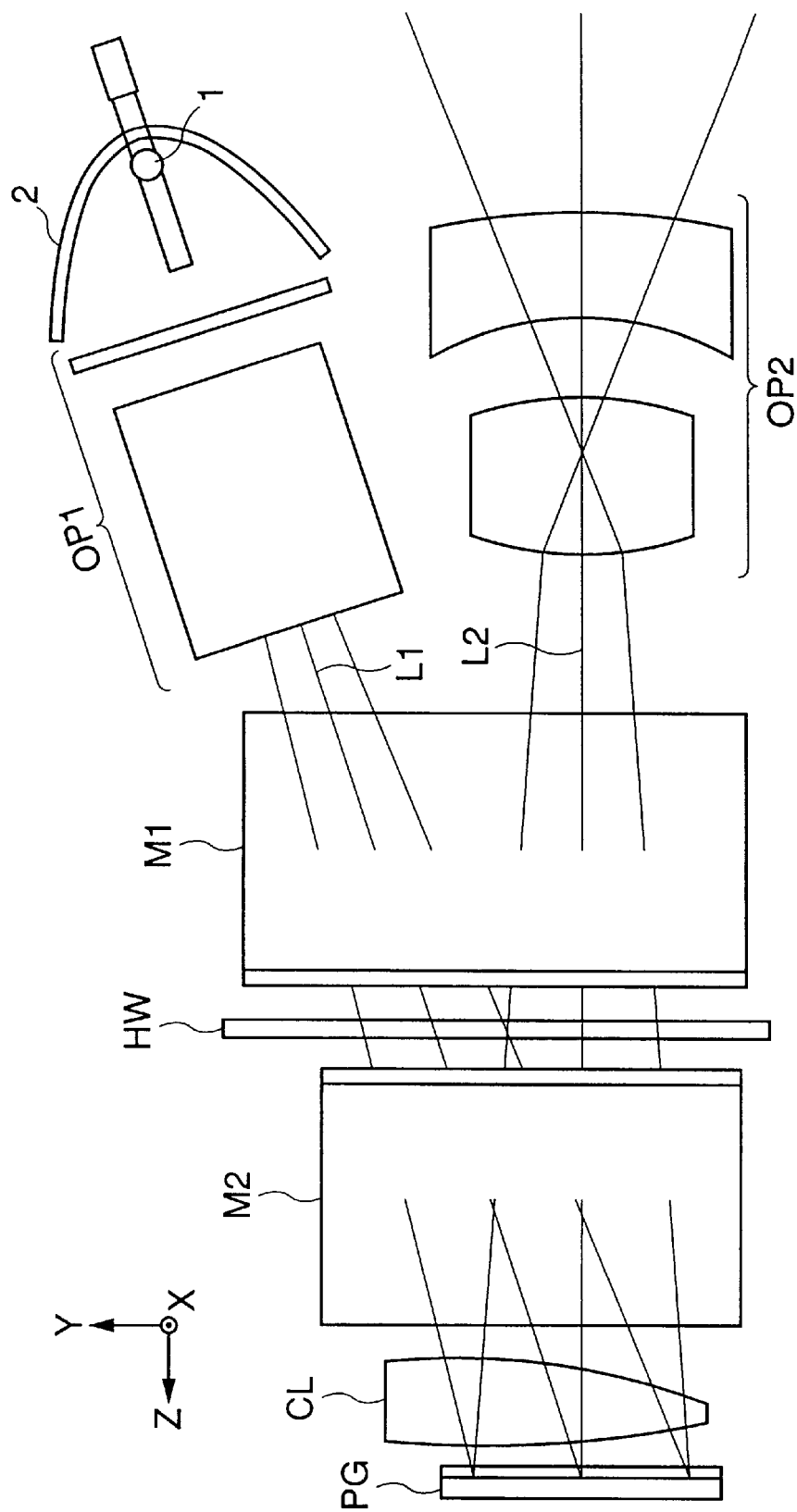
FIG. 2 is a sectional view, taken on the YZ plane, illustrating the optical arrangement of the projector optical system of the first embodiment.

FIG. 1 is a perspective view illustrating the projector optical system of a first embodiment of the present invention, and FIG. 2 is a sectional view, taken on the YZ plane, of the same projector optical system. In this embodiment, the projector optical system is provided with an illumination optical system (OP1), a first and a second color separating/integrating dichroic mirror (M1 and M2), a half-wave plate (HW), a projection lens system (OP2), and others. The illumination optical system (OP1) is designed to emit, as illumination light, only light polarized on a particular polarization plane, which will be described later. Moreover, the first and second dichroic mirrors (M1 and M2) both have a color separating/integrating dichroic surface formed thereon that separates the illumination light into light components of different colors and then directs those light components individually to three reflection-type LCD panels (PR, PG, and PB) and that integrates together the light components of different colors reflected from the reflection-type 1, CD panels (PR, PG, and PB) and then emits those light components thus integrated together as projection light. Note that the reflection-type LCD panels (PR, PG, and PB) are all of the type that have a polarizing plate (PP) on the front surface thereof. The polarizing plates (PP) serve to inhibit the portion of light that is not polarized in a predetermined direction from entering or exiting from the reflection-type LCD panels (PR, PG, and PB).

The half-wave plate (HW), which is disposed parallel to the XY plane between the first and second dichroic mirrors (M1 and M2), converts the polarization plane (A) of the illumination light emitted from the illumination optical system (OP1) into a different polarization plane. Moreover, though not shown in FIG. 1, on the mirror (M1 and M2) side of each of the reflection-type LCD panels (PR, PG, and PB) is disposed a condenser lens (CL). As shown in FIG. 2, the condenser lenses (CL) are arranged with their centers deviated from the centers of the display surfaces of the LCD panels, and thus allow light that is obliquely incident on the reflection-type LCD panels (PR, PG, and PB) to exit therefrom substantially perpendicularly and then enter the projection lens system (OP2). Note that, instead of the condenser lenses (CL), it is possible to use wedge prisms or the like to achieve the same effect. The projection lens system (OP2) projects the projection light thus integrated together to project the image carried thereby.

Figure 3:
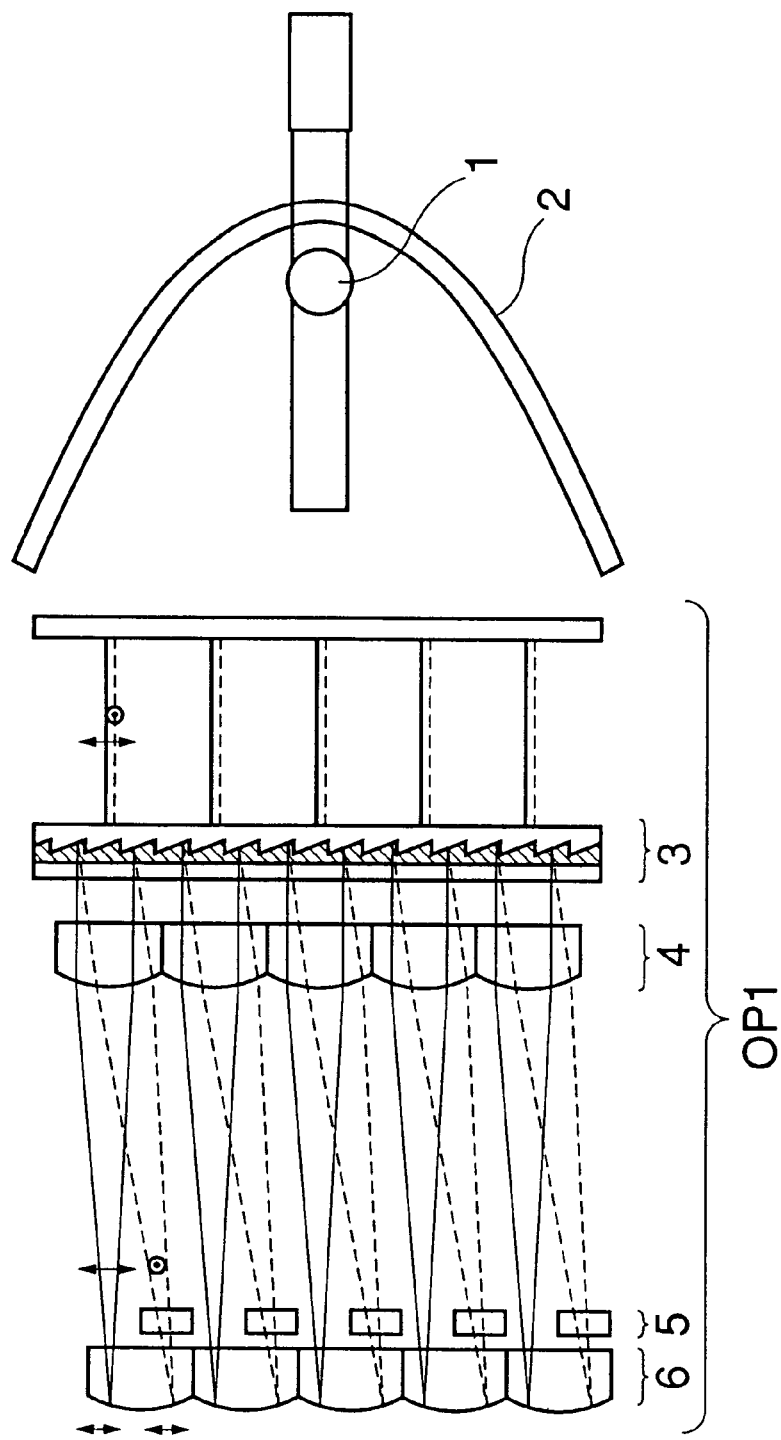
FIG. 3 is a sectional view illustrating the optical arrangement of the illumination optical system constituting a part of the projector optical system of the first embodiment.

FIG. 3 schematically illustrates a section of the illumination optical system (OP1) and other components. The light emitted from a light source (1) is reflected from a reflector (2), is thereby formed into a substantially parallel beam of non-polarized light, and then enters the illumination optical system (OP1). The illumination optical system (OP1) includes an integrator that serves to illuminate the reflection-type LCD panels (PR, PG, and PB) efficiently and evenly, a polarization conversion optical system that makes the polarization direction of the illumination light uniform, and others. The integrator is composed of a first and a second lens array (4 and 6). The polarization conversion optical system is composed of a birefringent diffraction grating (3) and a half-wave plate (5).

The birefringent diffraction grating (3) has a blaze-formed diffraction grating formed on a base made of glass or the like, with the portion hatched in the figure filled with a birefringent optical material. A birefringent optical material exhibits different refractive indices to light polarized on a polarization plane parallel to the plane of the figure and to light polarized on a polarization plane perpendicular to the plane of the figure. In FIG. 3, the refractive index that the birefringent optical material exhibits to light polarized on a polarization plane parallel to the plane of the figure is equal to the refractive index of the base. Accordingly, for such light, as indicated by the solid line, the presence of the blaze-formed diffraction grating can be ignored. On the other hand, the refractive index that the birefringent optical material exhibits to light polarized on a polarization plane perpendicular to the plane of the figure is different from the refractive index of the base. Accordingly, for such light, as indicated by the broken line, the blaze-formed diffraction grating causes diffraction.

The first lens array (4) adjoining the birefringent diffraction grating (3) causes a parallel beam to be focused onto the second lens array (6). Owing to the birefringent diffraction grating (3), light polarized on a polarization plane parallel to the plane of the figure and light polarized on a polarization plane perpendicular to the plane of the figure travel at slightly different angles and are thus focused onto different spots on the second lens array (6). The light polarized on the polarization plane perpendicular to the plane of the figure is converted, by the half-wave plate (5) disposed in the vicinity of the imaging position of the light, into light polarized on the polarization plane parallel to the plane of the figure. As a result, the illumination optical system (OP1) emits only light polarized on the polarization plane parallel to the plane of the figure. Note that a birefringent optical material is produced by, for example, orienting a liquid-crystal material in a predetermined direction. In addition, a liquid-crystal material is known that is hardened by being irradiated with ultraviolet light or the like. Even such a liquid-crystal material may be used, after first being oriented as described above and then being irradiated with ultraviolet light or the like.

As shown in FIGS. 1 and 2, both the illumination principal ray (L1) traveling from the beam center of the illumination light emitted from the illumination optical system (OP1) to the center of the reflection-type LCD panel (PG) and the projection principal ray (L2) traveling from the center of the reflection-type LCD panel (PG) to the center of the aperture stop of the projection lens system (OP2) lie on the YZ plane. The projection principal ray (L2) is parallel to the Z direction, and the illumination principal ray (L1) is inclined with respect to the Z direction. The normal vector to the dichroic surface lies on the XZ section. By making the section including the projection and illumination principal rays (the section in the illumination direction) substantially perpendicular to the section including the projection principal ray and the normal vector to the dichroic surface (the section in the color-integration direction), it is possible to minimize the back focal length. Although, in FIG. 1, the illumination and projection principal rays (L1 and L2) are illustrated only for the reflection-type LCD panel (PG) on which the G (green) light component is incident, in fact, similar principal rays exist also for the reflection-type LCD panels (PB and PR) on which the B (blue) and R (red) light components are incident. That is, the principal rays (L1 and L2) traveling toward the reflection-type LCD panels (PR and PB) are equivalent to the principal rays (L1 and L2) traveling toward the reflection-type LCD panel (PG) reflected from the first and second dichroic mirrors (M1 and M2). Accordingly, unless necessary, no description will be given as to the optical paths for the reflection-type LCD panels (PR and PB).

In FIG. 1, the Y' direction on the illumination principal ray (L1) and the Y direction on the projection principal ray (L2) indicate directions perpendicular to the respective principal rays (L1 and L2) on the YZ plane. Moreover, the S direction on the dichroic mirrors (M1 and M2) indicates the S-polarization direction that is determined by the principal rays (L1 and L2) and the dichroic mirrors (M1 and M2). This S-polarization direction is defined as the vector direction obtained by determining the outer product of the normal vector to the dichroic surface and the vector of the principal ray. In addition, by finding the outer product of the S-polarization direction and the vector of the principal ray, it is possible to obtain a P direction perpendicular to the S direction.

The first dichroic mirror (M1) reflects the B light component and transmits the R and G light components. On the other hand, the second dichroic mirror (M2) reflects the R light component and transmits the G light component. Moreover, the first and second dichroic mirrors (M1 and M2) are arranged with their dichroic surfaces inclined with respect to the illumination principal ray (L1) and the projection principal ray (L2). That is, the first and second dichroic mirrors (M1 and M2) are arranged with their dichroic surfaces parallel to the Y direction and with the normal vector thereto inclined along the XZ plane. Thus, the S-polarization direction is inclined in opposite directions in the first and second dichroic mirrors (M1 and M2).

Moreover, being reflected from the first dichroic mirror (M1), the B light component does not pass through the second dichroic mirror (M2). Accordingly, it is preferable to dispose a dummy glass plate (not shown in FIG. 1) that is optically equivalent to the second dichroic mirror (M2) between the first dichroic mirror (M1) and the reflection-type LCD panel (PB). This makes equal the mirror thickness through which the individual light components need to pass and thereby makes optically equivalent to one another the optical paths for the three reflection-type LCD panels (PR, PG, and PB).

The light exiting from the illumination optical system (OP1) mentioned previously is polarized on a polarization plane (A) (indicated by the broken line in FIG. 1) deviated from the Y' direction. In FIG. 3, the illumination optical system (OP1) is disposed with its polarization plane parallel to the plane of the figure aligned with the polarization plane (A). The polarization plane (A) has a polarization direction aligned with (or close to, within the limits described later) the S-polarization direction of the illumination principal ray (L1) on the first dichroic mirror (M1). The polarized light exiting from the illumination optical system (OP1) enters the first dichroic mirror (M1). After passing through the first dichroic mirror (M1), the polarized light passes through the half-wave plate (HW) having an optic axis (AXH) parallel to the Y direction, and thereby has its polarization plane rotated.

The polarized light exiting from the half-wave plate (HW) first passes through the second dichroic mirror (M2), and then, after passing through the condenser lens (CL), strikes the reflection-type LCD panel (PG). The polarized light transmitted through the half-wave plate (HW) has a polarization direction aligned with (or close to, within the limits described later) the S-polarized direction of the illumination principal ray (L1) on the second dichroic mirror (M2). Therefore, the reflection-type LCD panel (PG) receives illumination light having a polarization plane (B) whose polarization direction is slightly deviated from the Y direction.

The reflection-type LCD panel (PG) is so disposed that the normal to its display surface is aligned with the Z direction, that the direction of its longer sides is aligned with the X direction, and that the direction of its shorter sides is aligned with the Y direction. In contrast, the polarizing plate (PP) is so disposed that its polarization axis (AXP) (the polarization direction) is aligned, not with either of the directions of the shorter and longer sides (the Y and X directions) of the reflection-type LCD panel (PG), but with the direction of the polarization plane (B) of the illumination light. Accordingly, the reflection-type LCD panel (PG) receives illumination light having a polarization plane (B) parallel to the polarization axis (AXP) and emits projection light having the same polarization plane. In other words, for pixels for which image data is white, incident light is reflected without changing the polarization plane.

The projection light exiting from the reflection-type LCD panel (PG) passes through the condenser lens (CL), the second dichroic mirror (M2), the half-wave plate (HW), and the first dichroic mirror (M1) in this order, and is thereafter projected through the projection lens system (OP2) to form an image on a screen (not shown). Meanwhile, the projection principal ray (L2) has its S-polarization direction, as observed on the dichroic surface of the mirrors (M1 and M2), aligned with the direction of the shorter sides (the Y direction) of the reflection-type LCD panels (PR, PG, and PB).

Figure 4:
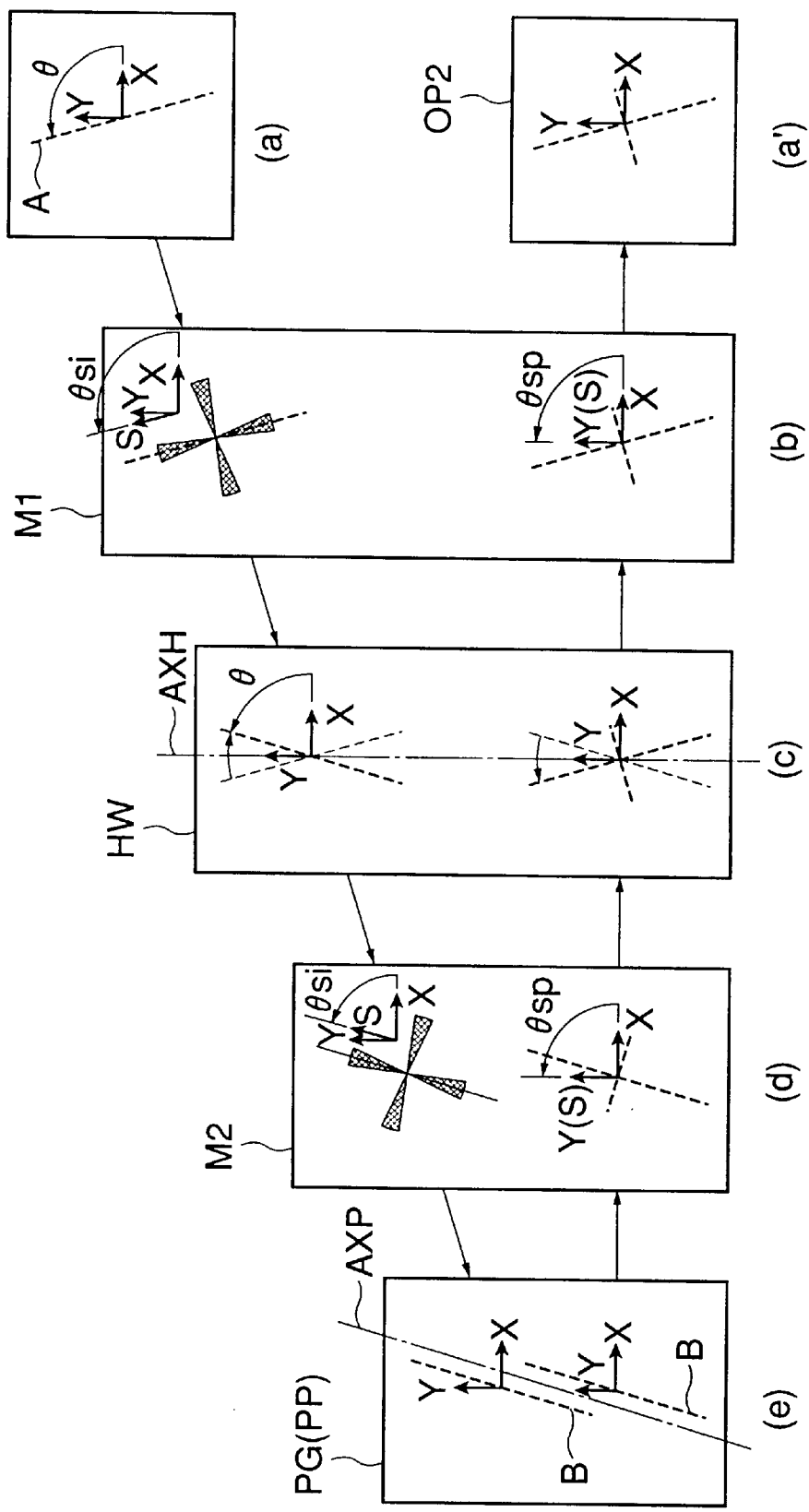
FIG. 4 is a diagram illustrating the relationship among the polarization plane, the dichroic mirror, and others in the projector optical system of the first embodiment.

Now, the relationship among the polarization plane of the illumination and projection light, the dichroic mirrors (M1 and M2), and others will be described in more detail with reference to FIG. 4. FIG. 4. illustrates the change of the polarization plane of the principal rays (L1 and L2) traveling from the illumination optical system (OP1) to the projection lens system (OP2), as observed along the Z direction from the reflection-type-LCD-panel (PG) side. In FIG. 4, the upper row shows the path of the illumination principal ray (L1), and the lower row shows the path of the projection principal ray (L2). Moreover, in FIG. 4, (a) shows the polarization state on the exiting side of the illumination optical system (OP1); (b) shows the same at the first dichroic mirror (M1); (c) shows the same at the half-wave plate (HW); (d) shows the same at the second dichroic mirror (M2); (e) shows the same at the reflection-type LCD panel (PG) and the polarizing plate (PP) fitted thereto; and (a') shows the same on the incident side of the projection lens system (OP2). In addition, the thick broken line indicates the polarization plane of the rays as observed at each of these locations.

The polarization state at each of the above-mentioned locations along, first, the illumination principal ray (L1) and, then, the projection principal ray (L2) will be described below. At the location (a), the ray emitted from the illumination optical system (OP1) has a polarization plane (A) inclined at 107° (=θ) with respect to the X axis. At the location (b), i.e. on the first dichroic mirror (M1), the illumination principal ray (L1) has an S-polarization direction inclined at 107° (=θsi) with respect to the X axis and thus aligned with the polarization plane (A) of the illumination light. Accordingly, the polarization plane does not suffer separation as described earlier. At the location (c), the half-wave plate (HW) has an optic axis (AXH) aligned with the Y direction, and thus the polarized light thus far inclined at 107° (=θ) with respect to the X axis is converted into polarized light inclined at 73° (=θ) with respect to the X axis. At the location (d), i.e. on the second dichroic mirror (M2), the illumination principal ray (L1) has an S-polarization direction inclined at 73° (=θsi) with respect to the X axis and thus aligned with the polarization plane converted by the half-wave plate (HW). Accordingly, also here, the polarization plane does not suffer separation as described earlier.

Next, at the location (e), the polarizing plate (PP) has a polarization axis (AXP) inclined at 73° with respect to the X axis and thus aligned with the polarization direction of the polarization plane (B) transmitted through the second dichroic mirror (M2). Therefore, the polarizing plate (PP) does not intercept the illumination light. The polarized light kept inclined at 73° with respect to the X axis exits from the reflection-type LCD panel (PG) and then enters the second dichroic mirror (M2). At the location (d), the S-polarization direction of the projection principal ray (L2) is aligned with the Y axis (θsp=90°) and thus does not coincide with the polarization plane of the projection light exiting from the reflection-type LCD panel (PG). This causes separation of the polarization plane, with the result that the projection light is no longer wholly linearly-polarized. Furthermore, on the first dichroic mirror (M1), the S-polarization direction of the projection principal ray (L1) having passed through the half-wave plate (HW) is aligned with the Y direction (θsp=90°), and thus does not coincide with the polarization plane of the projection light exiting from the half-wave plate (HW). This causes further separation of the polarization plane. However, separation of the polarization plane or the like occurring along the optical path of the projection light does not cause any serious problem, because the projection optical system, disposed on the downstream side of the reflection-type LCD panel (PG), does not include any element such as a polarizing plate that acts to limit the polarization direction.

Figure 9:
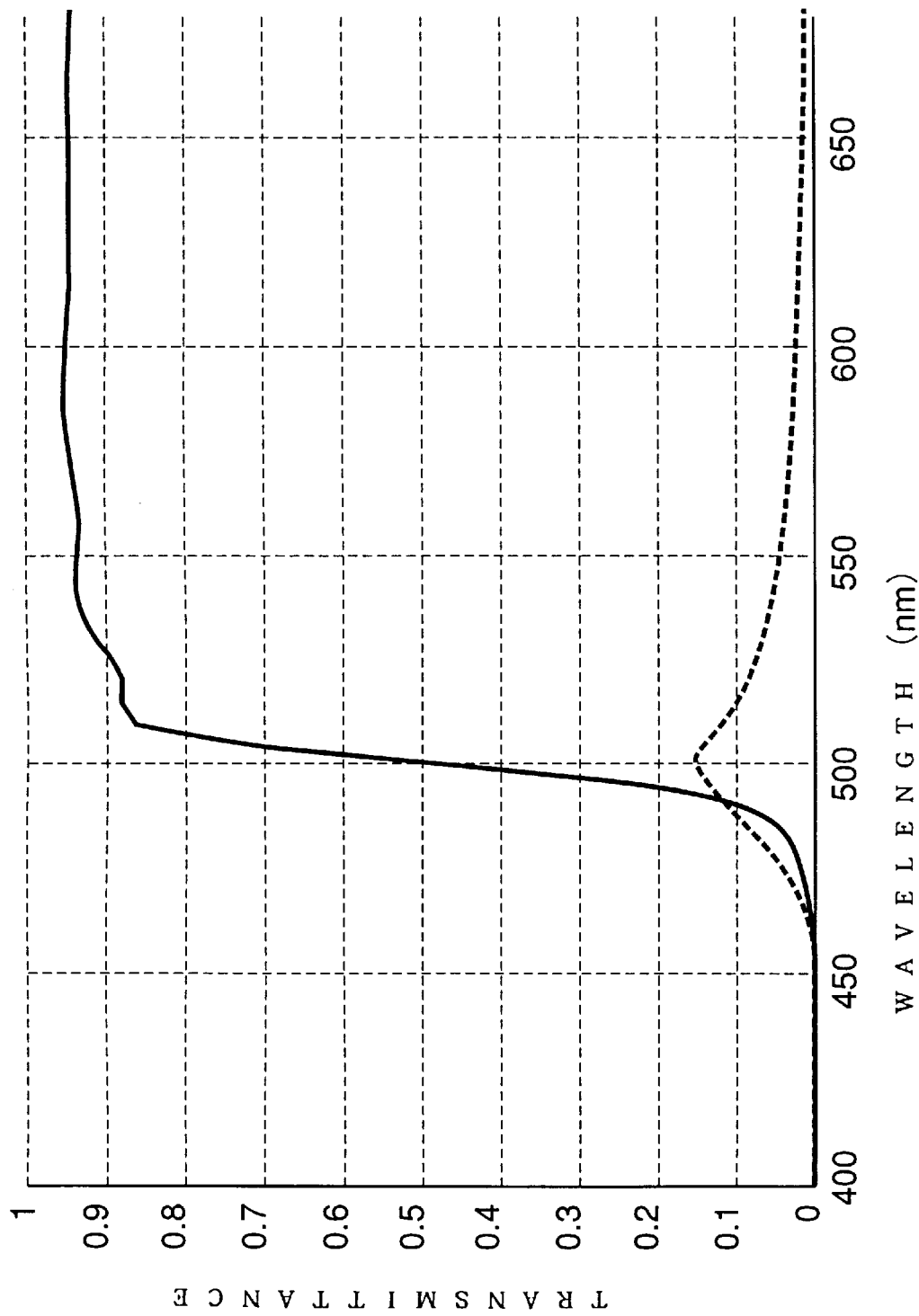
FIG. 9 is a graph showing the polarization-plane-separating characteristics of the first dichroic mirror (in a case where the polarization plane is aligned with the Y' direction)
Figure 10:
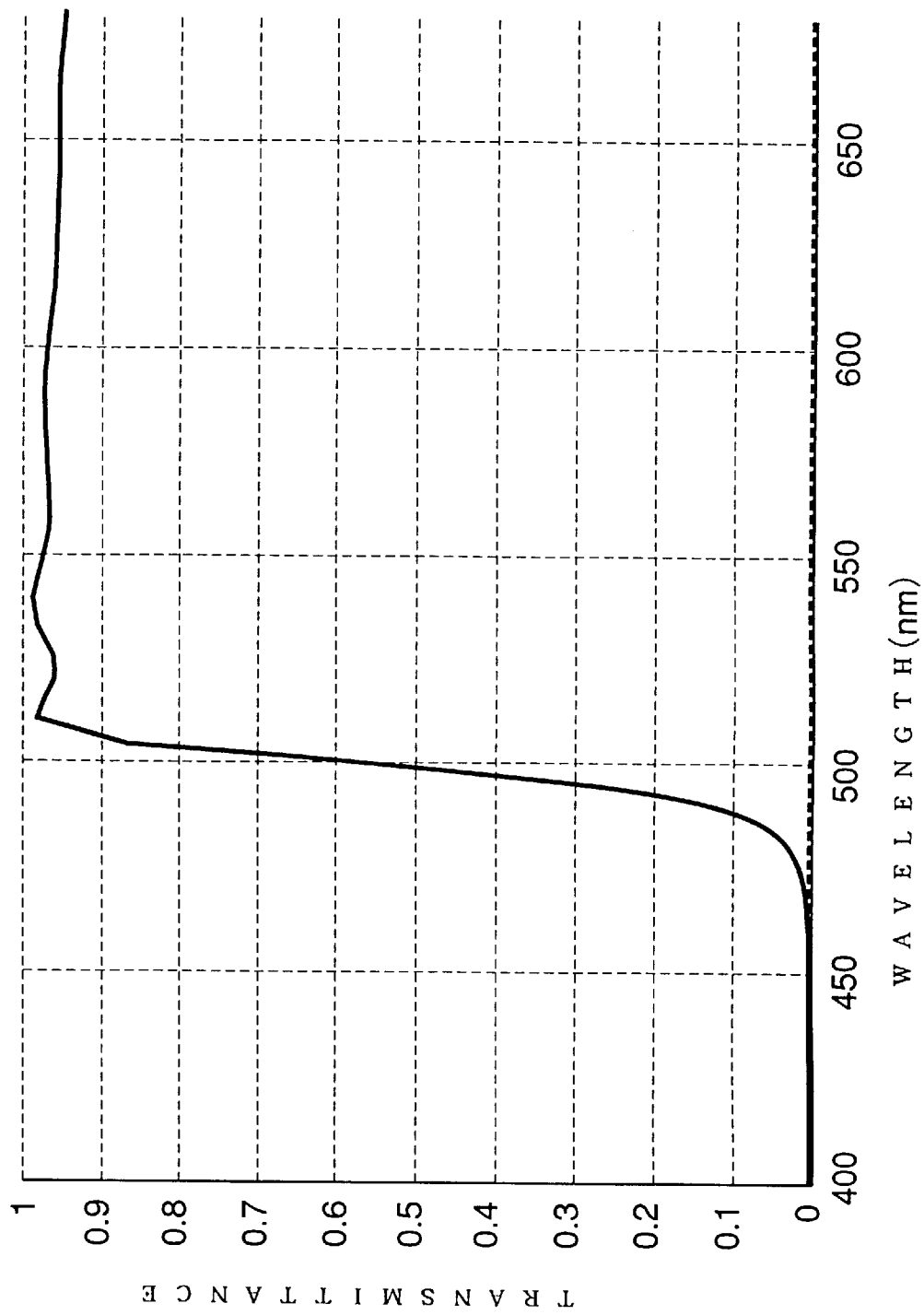
FIG. 10 is a graph showing the polarization-plane-separating characteristics of the first dichroic mirror (in a case where the polarization plane is aligned with the S direction)
Figure 11:
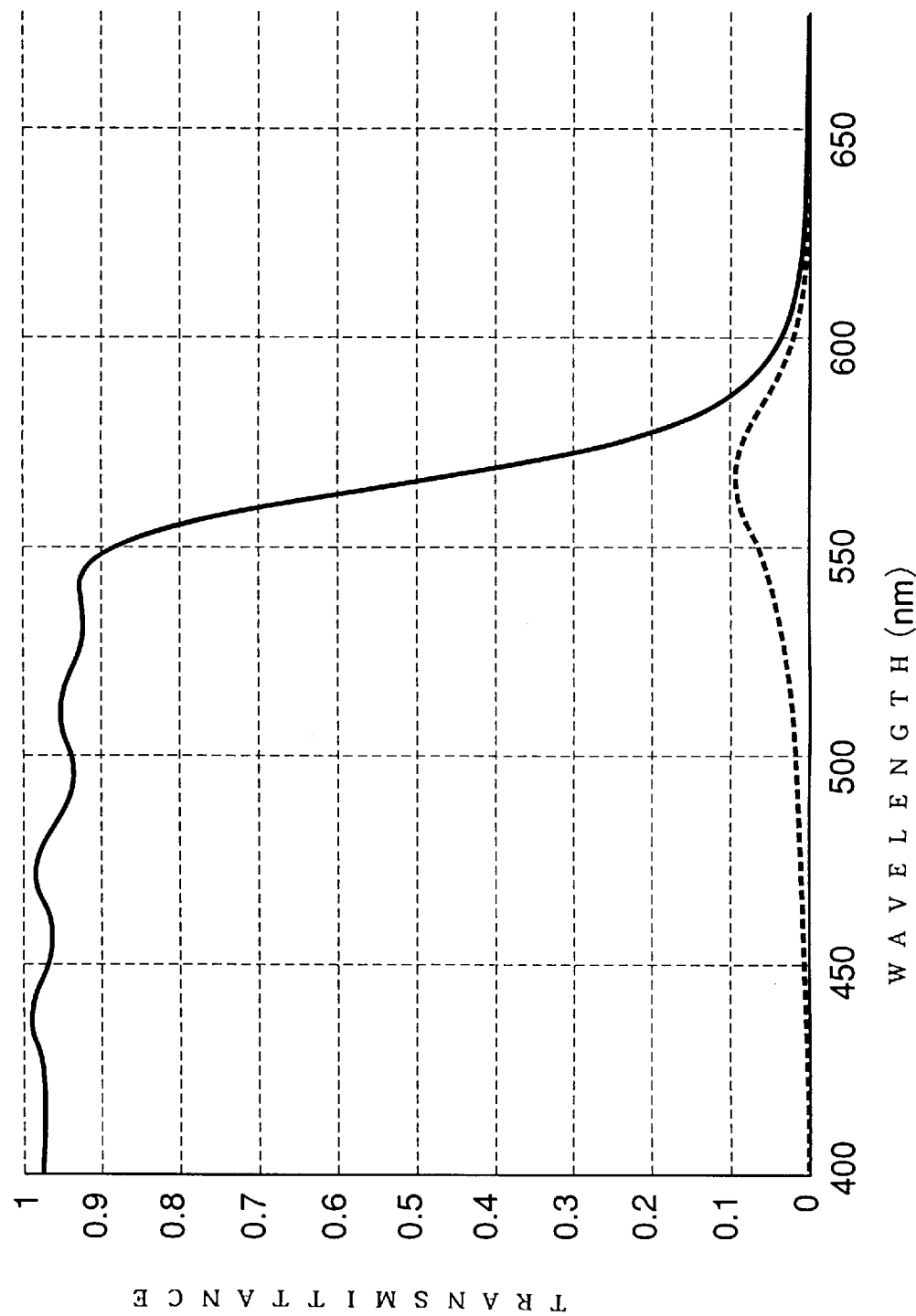
FIG. 11 is a graph showing the polarization-plane-separating characteristics of the second dichroic mirror (in a case where the polarization plane is aligned with the Y' direction)
Figure 12:
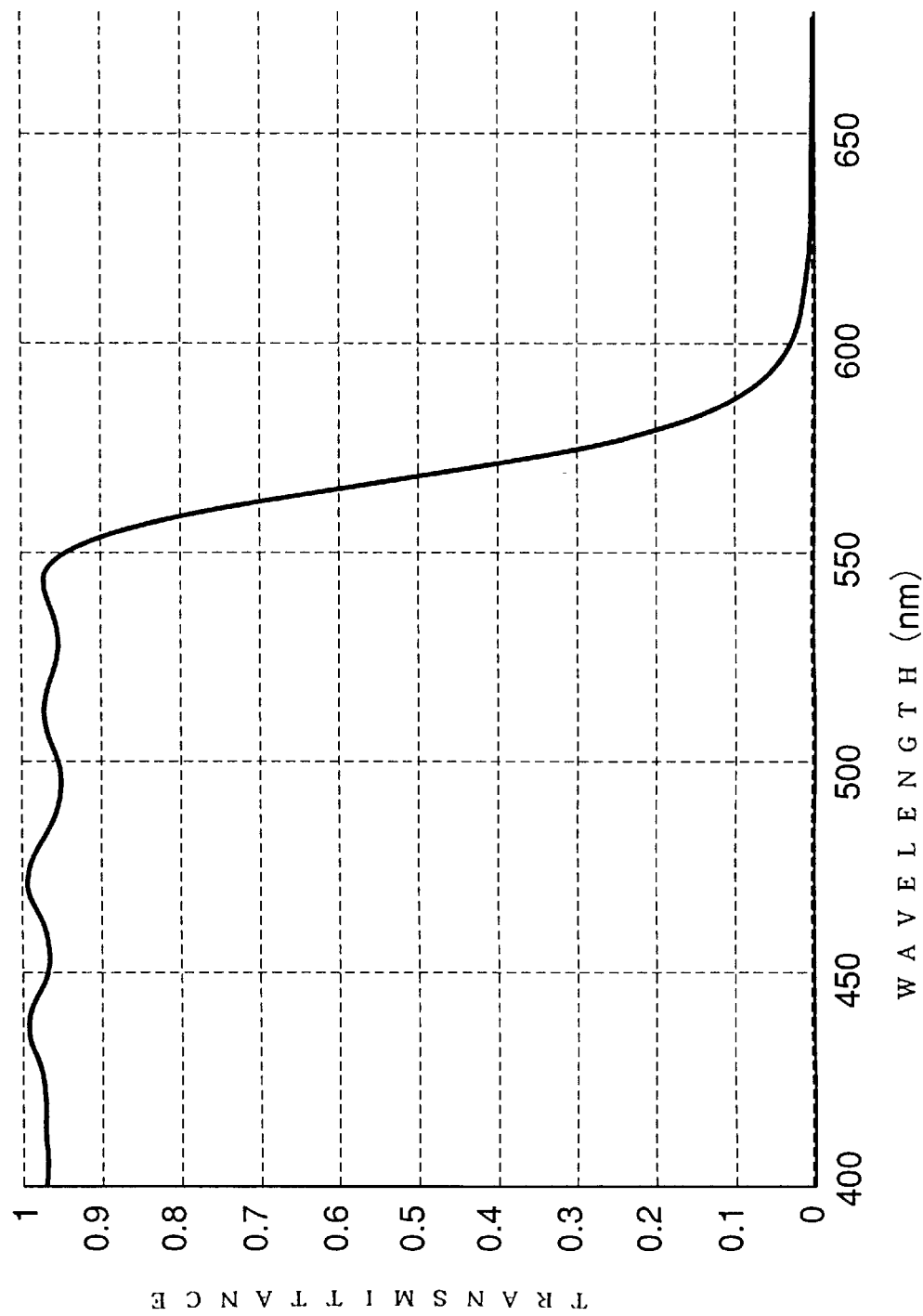
FIG. 12 is a graph showing the polarization-plane-separating characteristics of the second dichroic mirror (in a case where the polarization plane is aligned with the S direction)

Table 1 shows an example of the film structure of the first dichroic mirror (M1), and Table 2 shows an example of the film structure of the second dichroic mirror (M2). FIGS. 9 to 12 show the polarization-plane-separating characteristics of the dichroic mirrors (M1 and M2) having such film structures. FIG. 9 is a graph showing the spectral transmittance of the light components polarized in the X and Y' directions (indicated by the broken and solid lines, respectively) included in the illumination light incident on the first dichroic mirror (M1), when it is polarized in the Y' direction; FIG. 10 is a graph showing the spectral transmittance of the light components polarized in the S and P directions (indicated by the solid and broken lines, respectively) included in the illumination light incident on the first dichroic mirror (M1), when it is polarized in the S direction; FIG. 11 is a graph showing the spectral transmittance of the light components polarized in the X and Y' directions (indicated by the broken and solid lines, respectively) included in the illumination light incident on the second dichroic mirror (M2), when it is polarized in the Y' direction; and FIG. 12 is a graph showing the spectral transmittance of the light components polarized in the S and P directions (indicated by the solid and broken lines, respectively) included in the illumination light incident on the second dichroic mirror (M2), when it is polarized in the S direction.

In the first embodiment, although the projector optical system is so designed that the polarization plane of the illumination light is aligned with the S direction of the illumination principal ray (L1) on the dichroic mirrors (M1 and M2), it is also possible to design the projector optical system so that the polarization plane of the illumination light is aligned with the P direction (or the direction close thereto) perpendicular to the S direction. Moreover, the polarization plane may be located anywhere within the crosshatched areas in FIG. 4. Specifically, it is preferable that one of Conditions (1) to (4) below be fulfilled.

$$(½)·(θsi−θsp)<(θ−θsp)<(³⁄₂)·(θsi−θsp) \quad (1)$$

$$(½)·(θsi−θsp)>(θ−θsp)>(³⁄₂)·(θsi−θsp) \quad (2)$$

$$(½)·(θsi−θsp)<(θ−θsp+90)<(³⁄₂)·(θsi−θsp) \quad (3)$$

$$(½)·(θsi−θsp)>(θ−θsp+90)>(³⁄₂)·(θsi−θsp) \quad (4)$$

where

θ represents the angle (°) that the polarization plane of the illumination light makes with the predetermined reference axis (the X axis) on the dichroic surface;

θsi represents the angle (°) that the S-polarization plane of the illumination principal ray (L1) makes with the predetermined reference axis (the X axis) on the dichroic surface; and θsp represents the angle (°) that the S-polarization plane of the projection principal ray (L2) makes with the predetermined reference axis (the X axis) on the dichroic surface.

Conditions (1) to (4) define the ranges to be fulfilled to successfully prevent separation of the polarization plane (corresponding to the crosshatched areas in FIG. 4). Conditions (3) and (4) define the ranges in a direction 90 degrees apart from θ in Conditions (1) and (2) (For example, where θ=17°, θsi=107°, and θsp=90°). If one of Conditions (1) to (4) is fulfilled, the relationship between the S-polarization planes of the projection and illumination principal rays (L1 and L2) and the polarization plane (A) of the illumination light is set properly on the dichroic surface. This prevents degradation of efficiency and uneven color distribution due to separation of the polarization plane as occurs when the uniformly polarized the illumination light is subjected to color separation. In contrast, (1) to (4) is fulfilled, a high degree of separation of the polarization plane occurs when the illumination light passes through the dichroic mirrors (M1 and M2). This makes it impossible to achieve efficient use of the illumination light incident on the reflection-type LCD panels (PR, PG, and PB).

In the projector optical system of the first embodiment, on the first dichroic mirror (M1), the polarization plane (A) is inclined at θ (=107°) with respect to the X axis, the S-polarization direction of the illumination principal ray (L1) is inclined at θsi (=107°), and the S-polarization direction of the projection principal ray (L2) is inclined at θsp (=90°). Accordingly, Condition (1) is fulfilled (note that, in FIG. 4, the crosshatched areas shown at (b) indicate the ranges defined by Conditions (1) and (3)). Moreover, on the second dichroic mirror (M2), the polarization plane (A) is inclined at θ (=73°) with respect to the X axis, the S-polarization direction of the illumination principal ray (L1) is inclined at θsi (=73°), and the S-polarization direction of the projection principal ray (L2) is inclined at θsp (=90°). Accordingly, Condition (2) is fulfilled (note that, in FIG. 4, the crosshatched areas shown at (d) indicate the ranges defined by Conditions (2) and (4)). In this case, there is a difference of 17° between the angles θsi and θsp. In order to ensure sufficient brightness in the projection lens system (OP2) and to separate the illumination light properly from the projection light, it is preferable to secure a difference in angle of 10° or more.

Figure 13:
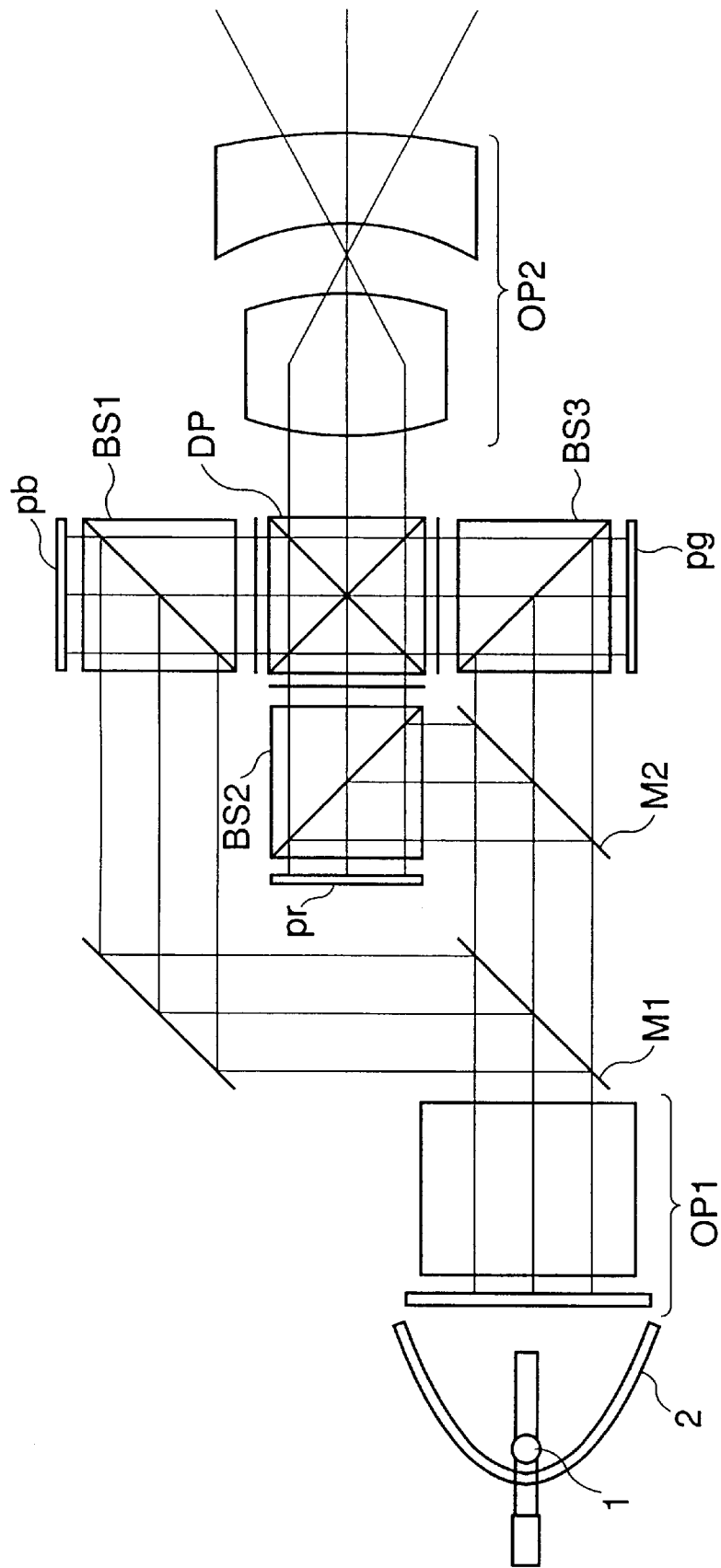
FIG. 13 is a sectional view illustrating the optical arrangement of a first example of a conventional projector optical system.
Figure 14:
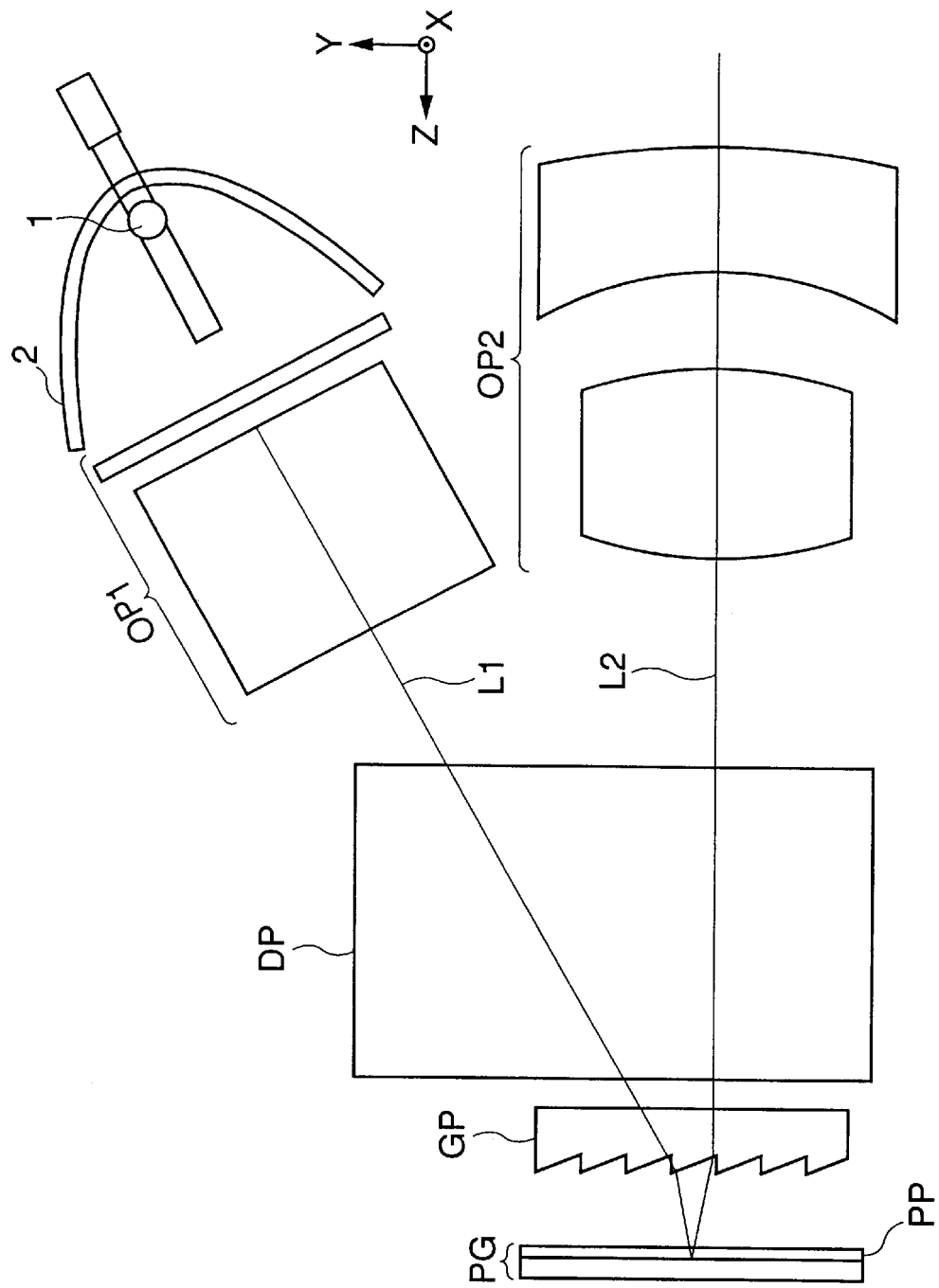
FIG. 14 is a sectional view illustrating the optical arrangement of a second example of a conventional projector optical system.
Figure 15:
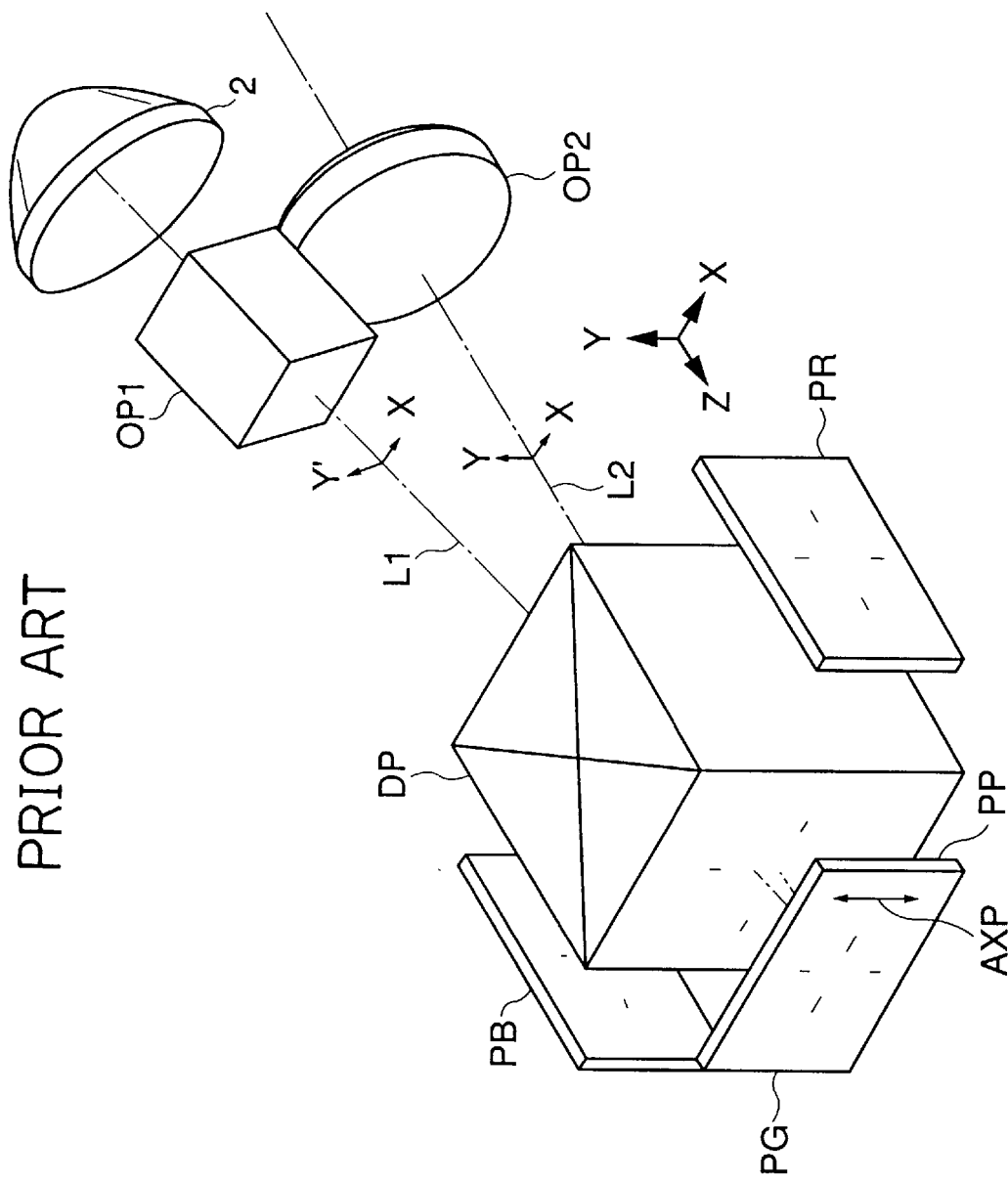
FIG. 15 is a perspective view illustrating the optical arrangement of the second example of a conventional projector optical system.
Figure 16:
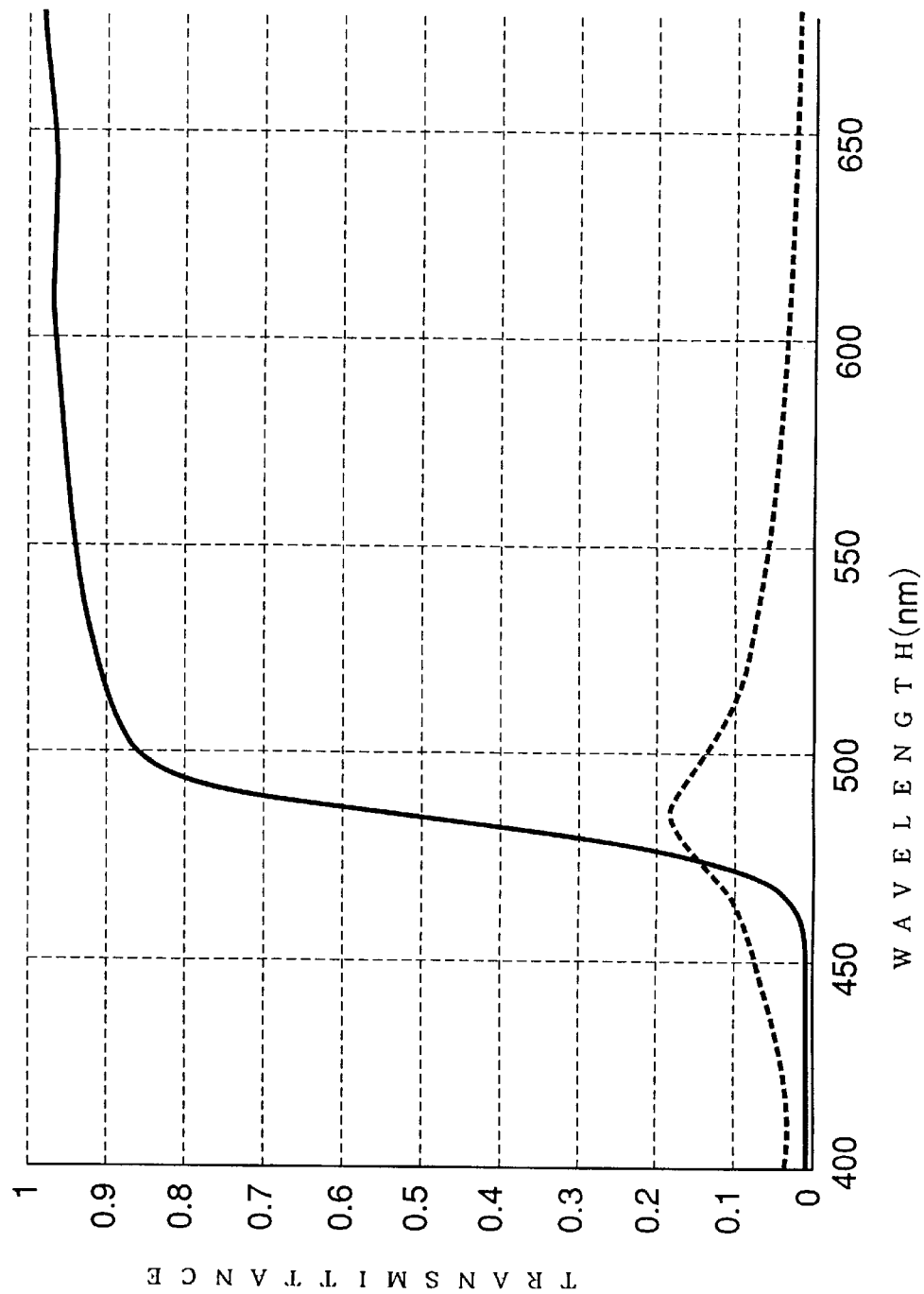
FIG. 16 is a graph showing the polarization-plane-separating characteristics of the dichroic prism employed in the second conventional example (in a case where the polarization plane is aligned with the Y' direction).

In a projector optical system that employs, like that of the first embodiment, dichroic-plate mirrors (M1 and M2) as color separating/integrating optical systems, in contrast to cases where a prism is used instead (for example, the conventional example shown in FIGS. 13 to 15), cost reduction can be achieved, but simultaneously it is necessary to secure a sufficiently long back focal length. In general, a projector optical system employing a color integrating optical system composed of a prism is built as a telecentric optical system. However, a projector optical system that employs, like that of the first embodiment, a plate mirror, needs to be built as a non-telecentric system, because the projection lens system (OP2) provided therein needs to have an unduly large size. A projector optical system built as a non-telecentric optical system tends to suffer from uneven color distribution. This is because axial and off-axial rays are incident on the dichroic surface at different angles. However, by fulfilling one of Conditions (1) to (4) noted above, it is possible to alleviate uneven color distribution. Moreover, by employing a gradient mirror, which offers gradually varying characteristics according to the regions of the dichroic surface thereof, as a dichroic mirror, it is possible to substantially eliminate uneven color distribution.

<Second Embodiment (FIGS. 5 and 6)>

Figure 5:
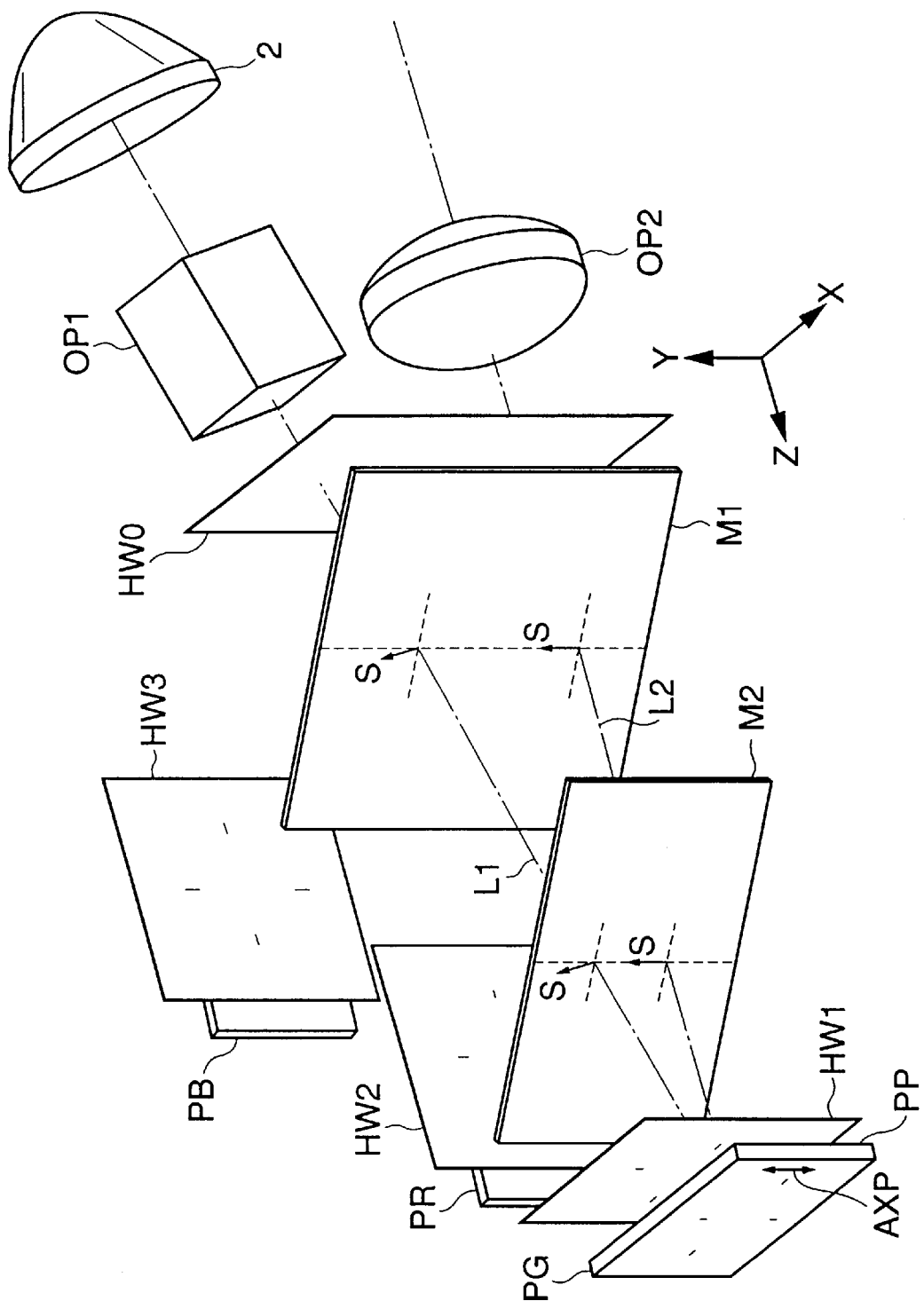
FIG. 5 is a perspective view illustrating the optical arrangement of the projector optical system of a second embodiment of the present invention.

FIG. 5 is a perspective view illustrating the projector optical system of a second embodiment of the present invention. This projector optical system has a first and a second dichroic mirror (M1 and M2) inclined in the same direction along the ZX plane and disposed parallel to each other (both dichroic mirrors have a dichroic surface parallel to the Y direction). Moreover, between an illumination optical system (OP1) and the first dichroic mirror (M1) is disposed a half-wave plate (HW0), and between the second dichroic mirror (M2) and reflection-type LCD panels (PR, PG, and PB) are disposed half-wave plates (HW1 to HW3). Note that, since the first and second dichroic mirrors (M1 and M2) are inclined in the same direction, it is not necessary to rotate the polarization plane therebetween.

Figure 6:
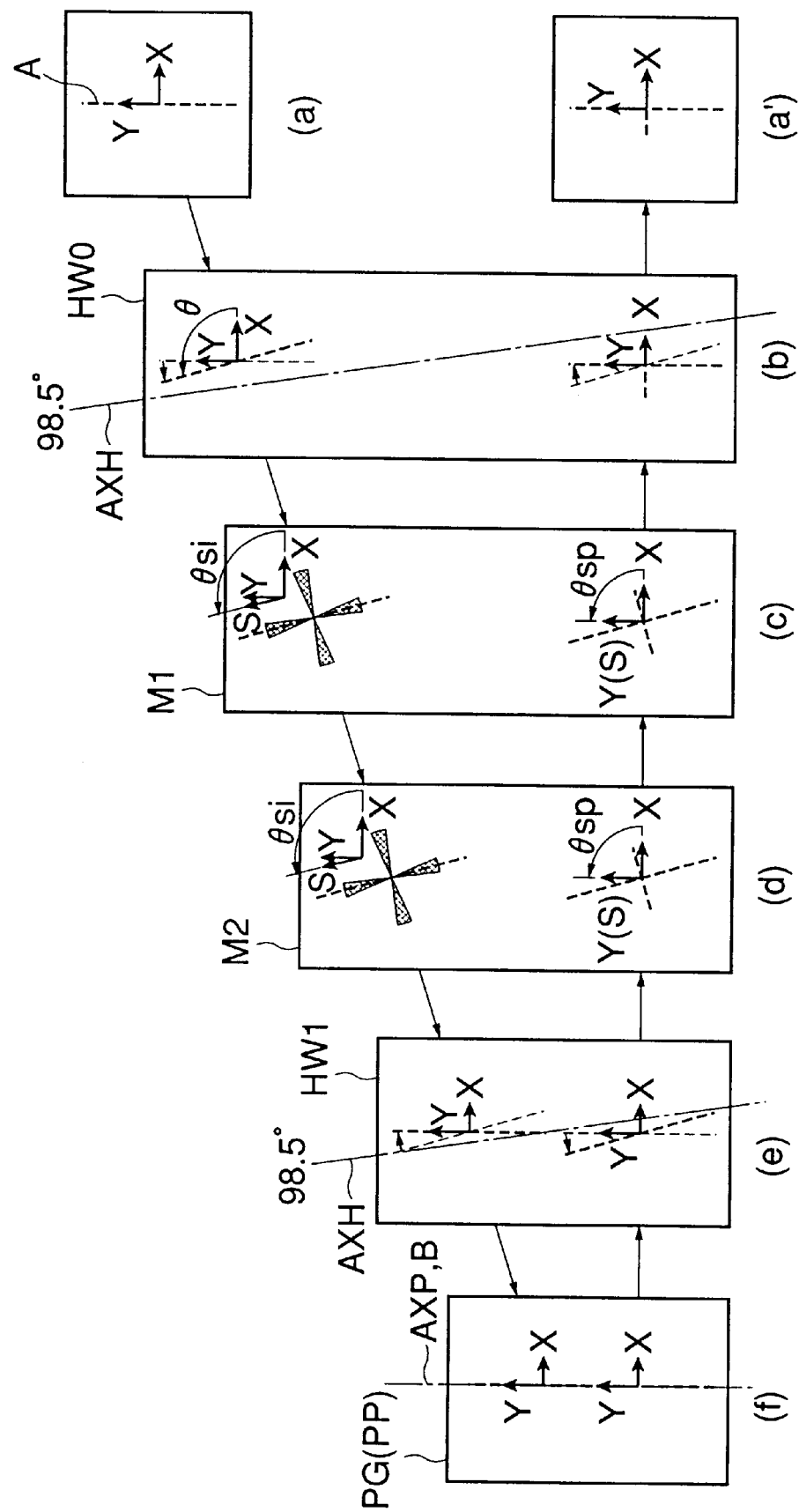
FIG. 6 is a diagram illustrating the relationship among the polarization plane, the dichroic mirror, and others in the projector optical system of the second embodiment.

FIG. 6 shows the relationship among the polarization plane of the illumination and projection light, the dichroic mirrors (M1 and M2), and others, as shown in FIG. 4. In FIG. 6, the upper row shows the path of the illumination principal ray (L1), and the lower row shows the path of the projection principal ray (L2). Moreover, in FIG. 6, (a) shows the polarization state on the exiting side of the illumination optical system (OP1); (b) shows the same at the half-wave plate (HW0); (c) shows the same at the first dichroic mirror (M1); (d) shows the same at the second dichroic mirror (M2); (e) shows the same at the half-wave plate (HW1); (f) shows the same at the reflection-type LCD panel (PG) and the polarizing plate (PP) fitted thereto; and (a') shows the same on the incident side of the projection lens system (OP2). In the projector optical system of the second embodiment, on both the first and second dichroic mirrors (M1 and M2), the polarization plane (A) is inclined at θ (=107°) with respect to the X axis, the S-polarization direction of the illumination principal ray (L1) is inclined at θsi (=107°), and the S-polarization direction of the projection principal ray (L2) is inclined at θsp (=90°). Accordingly, Condition (1) is fulfilled (note that, in FIG. 6, the crosshatched areas shown at (c) and (d) indicate the ranges defined by Conditions (1) and (3)).

In order for the polarization plane (A) of the illumination light emitted from the illumination optical system (OP1) to be deviated from the YZ plane, as in the projector optical system of the first embodiment, it is necessary to dispose the illumination optical system (OP1) at an angle. This complicates the design of the projector optical system. To overcome this inconvenience, the illumination optical system (OP1) is so disposed that the polarization plane (A) is parallel to the YZ plane, and a half-wave plate (HW0) is disposed between the illumination optical system (OP1) and the first dichroic mirror (M1). Specifically, between the illumination optical system (OP1) and the first dichroic mirror (M1), a half-wave plate (HW0) is disposed with its optic axis (AXH) inclined at 98.5° with respect to the X axis. By disposing a half-wave plate (HW0) in this way, even if the illumination optical system (OP1) is so disposed that the polarization plane (A) is parallel to the YZ plane (see (a) of FIG. 6), it is possible to convert the polarization plane of the illumination light into a polarization direction that fulfills Condition (1) or (3) noted above. This helps simplify the design of the projector optical system.

A half-wave plate (HW1) is disposed between the second dichroic mirror (M2) and the reflection-type LCD panel (PG) in the same manner as the half-wave plate (HWO). The reflection-type LCD panels (PR, PG, and PB) are designed as units that have a polarizing plate (PP) fitted on the front surface thereof. However, a reflection-type LCD panel of the type that has a polarizing plate (PP) disposed with its polarization axis (AXP) deviated from the directions of the shorter or longer sides of the panel is not fit for mass production, because it demands undue care. To solve this problem, the projector optical system employs reflection-type LCD panels (PR, PG, and PB) having a polarizing plate (PP) disposed with its polarization axis (AXP) parallel to the direction of the shorter sides (the Y direction) of the panels, and has half-wave plates (HW1 to HW3) disposed between the second dichroic mirror (M2) and the reflection-type LCD panels (PR, PG, and PB). By disposing half-wave plates (HW1 to HW3) in this way, even if the polarizing plate (PP) is disposed with its polarization axis (AXP) parallel to the direction of the shorter or longer sides (the Y or X direction) of the panels (see (f) of FIG. 6), it is possible to convert the polarization plane of the illumination light into a polarization direction that fulfills Condition (1) or (3) noted above. This allows the polarization plane (B) of the illumination light traveling toward the reflection-type LCD panels (PR, PG, and PB) to coincide with the polarization axis (AXP).

<Third Embodiment (FIGS. 7 and 8)>

Figure 7:
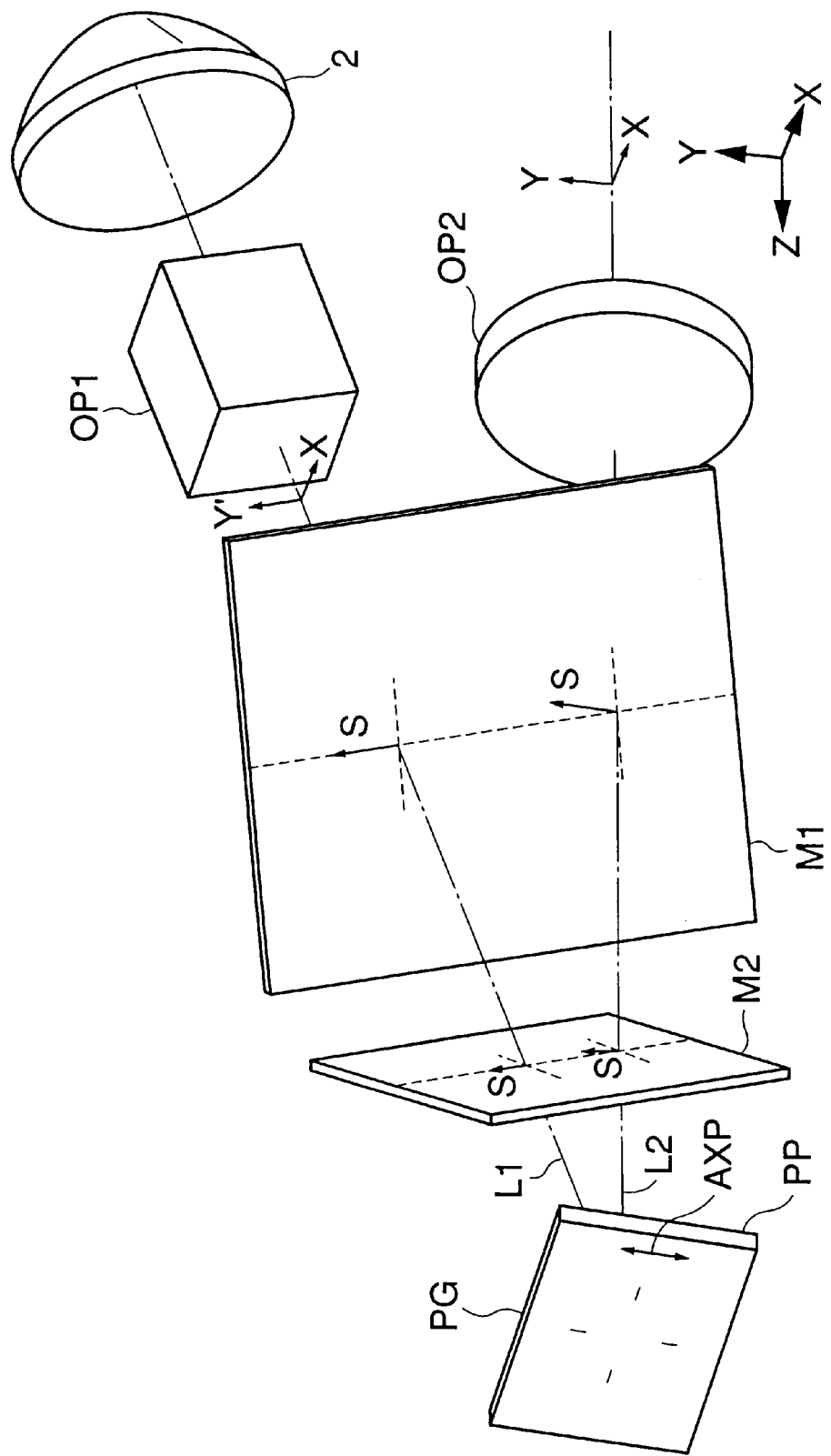
FIG. 7 is a perspective view illustrating the optical arrangement of the projector optical system of a third embodiment of the present invention.

FIG. 7 is a perspective view illustrating the projector optical system of a third embodiment of the present invention. Note that reflection-type LCD panels (PB and PR) are not shown in FIG. 7. In the projector optical system of the first and second embodiments, a first and a second dichroic mirror (M1 and M2) are disposed with a normal thereto inclined on the XZ plane (i.e. disposed with a normal thereto inclined with respect to an axis parallel to the Y direction). In contrast, in the projector optical system of the third embodiment, a first and a second dichroic mirror (M1 and M2) are disposed with a normal thereto inclined on a plane including the illumination principal ray (L1) and the X axis. This arrangement is realized by first disposing the dichroic mirrors (M1 and M2) perpendicularly to the illumination principal ray (L1) and then rotating them with respect to the axis along which the YZ plane intersects the dichroic surfaces (the axis parallel to the S direction of the illumination principal ray (L1) on the dichroic surfaces).

Figure 8:
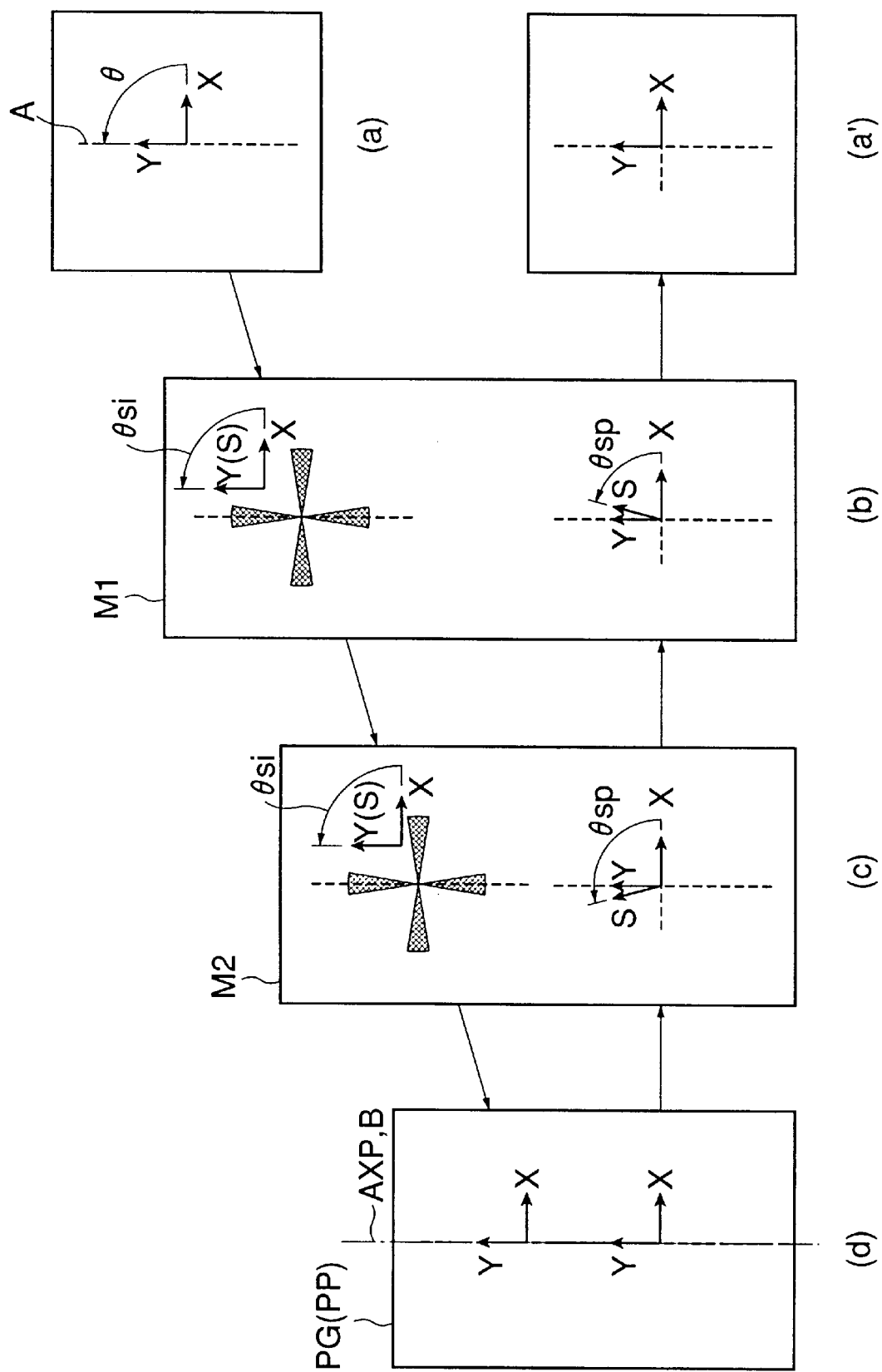
FIG. 8 is a diagram illustrating the relationship among the polarization plane, the dichroic mirror, and others in the projector optical system of the third embodiment.

FIG. 8 shows the relationship among the polarization plane of the illumination and projection light, the dichroic mirrors (M1 and M2), and others, as shown in FIG. 4. In FIG. 8, the upper row shows the path of the illumination principal ray (L1), and the lower row shows the path of the projection principal ray (L2). Moreover, in FIG. 8, (a) shows the polarization state on the exiting side of the illumination optical system (OP1); (b) shows the same at the first dichroic mirror (M1); (c) shows the same at the second dichroic mirror (M2); (d) shows the same at the reflection-type LCD panel (PG) and the polarizing plate (PP) fitted thereto; and (a') shows the same on the incident side of the projection lens system (OP2).

In the projector optical system of the third embodiment, on the first dichroic mirror (M1), the polarization plane (A) is inclined at θ (=90°) with respect to the X axis, the S-polarization direction of the illumination principal ray (L1) is inclined at θsi (=90°), and the S-polarization direction of the projection principal ray (L2) is inclined at θsp (=73°). Accordingly, Condition (1) is fulfilled (note that, in FIG. 8, the crosshatched areas shown at (b) indicate the ranges defined by Conditions (1) and (3)). Moreover, on the second dichroic mirror (M2), the polarization plane (A) is inclined at θ (=90°) with respect to the X axis, the S-polarization direction of the illumination principal ray (L1) is inclined at θsi (=90°), and the S-polarization direction of the projection principal ray (L2) is inclined at θsp (=107°). Accordingly, Condition (2) is fulfilled (note that, in FIG. 8, the crosshatched areas shown at (c) indicate the ranges defined by Conditions (2) and (4)).

The illumination light emitted from the illumination optical system (OP1) is wholly polarized in the Y' direction (the direction perpendicular to the illumination principal ray (L1) on the YZ plane), and thus, as shown at (a) in FIG. 8, the polarization plane (A) is aligned with the Y direction. According to the arrangement of the dichroic mirrors described above, although the dichroic mirrors (M1 and M2) are inclined in different directions, the S direction of the illumination principal ray (L1) is identical, lying on the YZ plane, on the dichroic mirror (M1) and on the dichroic mirror (M2), with the S direction. Accordingly, as shown at (b) and (c) in FIG. 8, the S directions of the illumination principal ray (L1), like the polarization plane (A), coincides with the Y direction on the dichroic mirrors (M1 and M2). Moreover, when the illumination light exiting from the second dichroic mirror (M2) strikes the reflection-type LCD panel (PG), as shown at (d) in FIG. 8, the polarization plane (B) coincides with the direction (the Y direction) of the polarization axis (AXP) of the polarizing plate (PP).

In the projector optical system of the first and second embodiments, the S direction of the projection principal ray (L2) lies on the YZ plane on the dichroic mirrors (M1 and M2). In contrast, in the projector optical system of the third embodiment, the projection principal ray (L2) has its S direction deviated from the YZ plane on the dichroic mirrors (M1 and M2). Thus, although the polarization direction (the Y direction) of the illumination and projection light is kept unchanged, the projection light is deviated from the S direction when passing through the dichroic mirrors (M1 and M2), and therefore the projection light suffers separation of its polarization plane.

the projector optical system of the third embodiment requires complicated arrangement of the dichroic mirrors (M1 and M2). However, both the polarization plane (A) of the illumination light emitted from the illumination optical system (OP1) and the polarization axis (AXP) of the polarizing plate (PP) provided in the reflection-type LCD panel (PG) lie on the YZ plane. This helps simplify the design of the projector optical system. Moreover, the projector optical system does not require a half-wave plate or the like and thus contributes to cost reduction.

TABLE 1

<Film Structure of First Dichroic Mirror (M1)>
(Reference Wavellength: 484 nm)

| Layer | Refractive Index | Optical Film Thickness |
|---|---|---|
| 23 | 1 | |
| 22 | 2.05 | 0.125 |
| 21 | 1.47 | 0.255 |
| 20 | 2.05 | 0.271 |
| 19 | 1.47 | 0.247 |
| 18 | 2.05 | 0.255 |
| 17 | 1.47 | 0.237 |
| 16 | 2.05 | 0.244 |
| 15 | 1.47 | 0.248 |
| 14 | 2.05 | 0.251 |
| 13 | 1.47 | 0.252 |
| 12 | 2.05 | 0.247 |

TABLE 1-continued

<Film Structure of First Dichroic Mirror (M1)>
(Reference Wavelength: 484 nm)

| Layer | Refractive Index | Optical Film Thickness |
|---|---|---|
| 11 | 1.47 | 0.245 |
| 10 | 2.05 | 0.243 |
| 9 | 1.47 | 0.247 |
| 8 | 2.05 | 0.250 |
| 7 | 1.47 | 0.241 |
| 6 | 2.05 | 0.246 |
| 5 | 1.47 | 0.221 |
| 4 | 2.05 | 0.238 |
| 3 | 1.47 | 0.231 |
| 2 | 2.05 | 0.125 |
| 1 | 1.62 | 0.625 |
| 0 | 1.52 | Base |

TABLE 2

<Film Structure of Second Dichroic Mirror (M2)>
(Reference Wavelength: 740 nm)

| Layer | Refractive Index | Optical Film Thickness |
|---|---|---|
| 18 | 1 | |
| 17 | 1.385 | 0.14 |
| 16 | 2.3 | 0.28 |
| 15 | 1.47 | 0.28 |
| 14 | 2.3 | 0.26 |
| 13 | 1.47 | 0.25 |
| 12 | 2.3 | 0.25 |
| 11 | 1.47 | 0.25 |
| 10 | 2.3 | 0.25 |
| 9 | 1.47 | 0.25 |
| 8 | 2.3 | 0.25 |
| 7 | 1.47 | 0.25 |
| 6 | 2.3 | 0.25 |
| 5 | 1.47 | 0.25 |
| 4 | 2.3 | 0.26 |
| 3 | 1.47 | 0.28 |
| 2 | 2.3 | 0.28 |
| 1 | 1.62 | 0.14 |
| 0 | 1.52 | Base |

What is claimed is:

1. A projector optical system comprising:

an illumination optical system for emitting polarized light as illumination light;

a dichroic surface that separates the illumination light into light components of different colors and then directs those light components individually to a plurality of reflection-type display panels each having a polarizing plate on a front surface thereof and that integrates together the light components of different colors reflected from the reflection-type display panels and then emits those light components thus integrated together as projection light; and a projection lens system for displaying an image by projecting the projection light, wherein the dichroic surface is inclined with respect to an illumination principal ray traveling from a beam center of the illumination light emitted from the illumination optical system to centers of the reflection-type display panels, and also with respect to a projection principal ray traveling from the centers of the reflection-type display panels to a center of an aperture stop of the projection lens system, wherein one of the following conditions (1) to (4) is fulfilled:

$$(1/2)\cdot(\theta si-\theta sp)<(\theta-\theta sp)<(3/2)\cdot(\theta si-\theta sp) \quad (1)$$

$$(1/2)\cdot(\theta si-\theta sp)>(\theta-\theta sp)>(3/2)\cdot(\theta si-\theta sp) \quad (2)$$

$$(1/2)\cdot(\theta si-\theta sp)<(\theta-\theta sp+90)<(3/2)\cdot(\theta si-\theta sp) \quad (3)$$

$$(1/2)\cdot(\theta si-\theta sp)>(\theta-\theta sp+90)>(3/2)\cdot(\theta si-\theta sp) \quad (4)$$

where $\theta$ represents an angle (°) that the polarization plane of the illumination light makes with a predetermined reference axis on the dichroic surface;

$\theta si$ represents an angle (°) that an S-polarization plane of the illumination principal ray makes with the predetermined reference axis on the dichroic surface; and $\theta sp$ represents an angle (°) that an S-polarization plane of the projection principal ray makes with the predetermined reference axis on the dichroic surface.

2. A projector optical system as claimed in claim 1, wherein two dichroic mirrors are provided with each having a dichroic surface as defined in claim 1.

3. A projector optical system as claimed in claim 1, wherein an S-polarization direction of the projection principal ray on the dichroic surface coincides with a direction of shorter sides of the reflection-type display panels, and wherein polarization directions of the polarizing plates do not coincide with either the direction of the shorter sides or a direction of longer sides of the reflection-type display panels.

4. A projector optical system as claimed in claim 1, wherein a first dichroic surface and a second dichroic surface are provided as the dichroic surface, and a half-wave plate is disposed between the illumination optical system and the first dichroic surface, between the first dichroic surface and the second dichroic surface, or between the second dichroic surface and the reflection-type display panels, the half-wave plate converting the polarization plane of the illumination light emitted from the illumination optical system to a different polarization plane.

5. A projector optical system as claimed in claim 1, wherein a plane including the illumination principal ray and the projection principal ray is substantially perpendicular to a plane including the projection principal ray and a vector of a normal to the dichroic surface.

* * * * *